(12) United States Patent
Choi et al.

(10) Patent No.: US 10,290,898 B2
(45) Date of Patent: May 14, 2019

(54) COMPOSITE, METHOD OF PREPARING THE COMPOSITE, ELECTROLYTE COMPRISING THE COMPOSITE, AND LITHIUM SECONDARY BATTERY COMPRISING THE ELECTROLYTE

(71) Applicant: Samsung Electronics Co., Ltd., Suwon-si, Gyeonggi-Do (KR)

(72) Inventors: Hongsoo Choi, Seoul (KR); Yonggun Lee, Incheon (KR); Jenam Lee, Seongnam-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 128 days.

(21) Appl. No.: 14/838,472

(22) Filed: Aug. 28, 2015

(65) Prior Publication Data

US 2016/0064773 A1 Mar. 3, 2016

(30) Foreign Application Priority Data

Aug. 29, 2014 (KR) .......................... 10-2014-0114525
Apr. 30, 2015 (KR) .......................... 10-2015-0062017

(51) Int. Cl.
*H01M 6/14* (2006.01)
*H01M 10/0565* (2010.01)
(Continued)

(52) U.S. Cl.
CPC ..... *H01M 10/0565* (2013.01); *H01M 10/052* (2013.01); *H01M 10/056* (2013.01); *H01M 10/0525* (2013.01); *H01M 10/0563* (2013.01); *H01M 2220/20* (2013.01); *H01M 2300/002* (2013.01); *H01M 2300/0082* (2013.01); *H01M 2300/0091* (2013.01); *Y02T 10/7011* (2013.01)

(58) Field of Classification Search
CPC .......... H01M 4/362; H01M 4/60; H01M 4/38; H01M 2/1633; H01M 2/1666; H01M 2/145; H01M 4/04; H01M 10/052; H01M 10/0564; H01M 2220/20; H01M 2300/02; H01M 2300/0082; Y02T 10/7011
See application file for complete search history.

(56) References Cited

U.S. PATENT DOCUMENTS

| 4,357,215 A | 11/1982 | Goodenough et al. |
| 7,513,136 B2 | 4/2009 | Laliberte et al. |

(Continued)

FOREIGN PATENT DOCUMENTS

| CN | 101466750 A | 6/2009 |
| CN | 102928474 A | 2/2013 |

(Continued)

OTHER PUBLICATIONS

Extended European Search Report for European Patent Application No. 15183064.3 dated Mar. 8, 2016.

(Continued)

*Primary Examiner* — Raymond Alejandro
(74) *Attorney, Agent, or Firm* — Cantor Colburn LLP

(57) ABSTRACT

A composite including a metal-organic framework; and an ionic liquid disposed in a pore defined by the metal-organic framework. Also a method of preparing the composite, an electrolyte including the composite, and a lithium secondary battery including the electrolyte.

38 Claims, 19 Drawing Sheets

(51) Int. Cl.
*H01M 10/052* (2010.01)
*H01M 10/0563* (2010.01)
*H01M 10/0525* (2010.01)
*H01M 10/056* (2010.01)

(56) References Cited

U.S. PATENT DOCUMENTS

| | | | |
|---|---|---|---|
| 7,531,012 | B2 | 5/2009 | Sudano et al. |
| 7,547,492 | B2 | 6/2009 | Awano et al. |
| 7,968,224 | B2 | 6/2011 | Sudano et al. |
| 8,445,140 | B2 | 5/2013 | Bertin et al. |
| 8,802,320 | B2 | 8/2014 | Choi et al. |
| 9,105,940 | B2 | 8/2015 | Lee et al. |
| 2006/0134525 | A1 | 6/2006 | Kleijnen et al. |
| 2009/0263725 | A1 | 10/2009 | Balsara et al. |
| 2011/0206994 | A1* | 8/2011 | Balsara ............ H01M 10/0565 429/302 |
| 2011/0260100 | A1 | 10/2011 | Trukhan et al. |
| 2011/0281173 | A1 | 11/2011 | Singh et al. |
| 2012/0297892 | A1 | 11/2012 | Neuburger et al. |
| 2012/0297982 | A1 | 11/2012 | Dinca et al. |
| 2014/0045074 | A1 | 2/2014 | Wiers et al. |
| 2015/0004499 | A1* | 1/2015 | Kitagawa ............ H01B 1/122 429/306 |
| 2015/0155594 | A1 | 6/2015 | Lee et al. |
| 2016/0013515 | A1 | 1/2016 | Lee et al. |
| 2016/0064770 | A1 | 3/2016 | Lee et al. |
| 2016/0064772 | A1 | 3/2016 | Choi et al. |
| 2016/0079625 | A1 | 3/2016 | Shon et al. |
| 2016/0087306 | A1 | 3/2016 | Lee et al. |
| 2016/0093879 | A1 | 3/2016 | Song et al. |

FOREIGN PATENT DOCUMENTS

| | | |
|---|---|---|
| KR | 1020070077977 | 7/2007 |
| KR | 1020090023995 A | 3/2009 |
| KR | 1020110136448 A | 12/2011 |
| KR | 1020120031738 A | 4/2012 |
| KR | 1020120108829 A | 10/2012 |
| WO | 2013/161452 A1 | 10/2013 |

OTHER PUBLICATIONS

Wang et al., Porous anatase $TiO_2$ constructed from a metal-organic framework for advanced lithium-ion battery anodes, Journal of Materials Chemistry A, No. 2, 2014, pp. 12571-12575.

Yuan et al., "Enhanced electrochemical performance of poly(ethiylene oxide) based composite polymer electrolyte by incorporation of nano-sized metal-organic framework", Journal of Power Sources, vol. 240, 2013, pp. 653-658.

Korean Office Action for Korean Patent Application 10-2015-0062017 dated Jun. 16, 2016.

Brian M. Wiers, et al., "A Solid Lithium Electrolyte via Addition of Lithium Isopropozide to a Metal-Organic Framework with Open Metal Sites", J. Am. Chem. Soc., 2011, 133, 14522-14525.

Changfu Yuan, et al., "Enhanced electrochemical performance of poly(ethylene oxide) based composite polymer electrolyte by incorporation of nano-sized metal-organic framework", Journal of Power Sources, 240 (2013) 653-658.

Dean m. Tigelaar, et al., "Composite Electrolytes for Lithium Batteries: Ionic Liquids in APTES Cross-Linked Polymers", Macromolecules 2007, 40, 4159-4164.

Development of porous materials, https://web.ua.es/Ima/Webpersonal/Research%20Interests.htm.

G.B. Appetecchi, et al., "Hot-pressed, dry, composite, PEO-based electrolyte membranes I. Ionic conductivity characterization", Journal of Power Sources, 114 (2003) 105-112.

Joon-Ho Shin, et al., "PEO-Based Polymer Electrolytes with Ionic Liquids and Their Use in Lithium Metal-Polymer Electrolyte Batteries", J. Electrochem. Soc. 2005, vol. 152, Issue 5, pp. A978-A983.

Kazuo Murata, et al., "An overview of the research and development of solid polymer electrolyte batteries", Electrochemica Acta 45 (2000) 1501-1508.

Mingtao Li, et al., "Polymer electrolytes containing guanidinium-based polymeric ionic liquids for rechargeable lithium batteries", Journal of Power Sources 196 (2011) 8662-8668.

U.Fano, "Ionization Yield of Radiations. II. The Fluctuations of the Number of Ions", Physical Review, vol. 72, No. 1, 1947, 26-29.

Office Action issued by the Chinese Patent Office dated Oct. 8, 2018, in the examination of the Chinese Patent Application No. 201510542656.0, with English Translation.

\* cited by examiner

COMPOSITE, METHOD OF PREPARING THE COMPOSITE, ELECTROLYTE COMPRISING THE COMPOSITE, AND LITHIUM SECONDARY BATTERY COMPRISING THE ELECTROLYTE

CROSS REFERENCE TO RELATED APPLICATIONS

This application claims priority to and the benefit of Korean Patent Application Nos. 10-2014-0114525, filed on Aug. 29, 2014, and 10-2015-0062017, filed on Apr. 30, 2015, in the Korean Intellectual Property Office, and all the benefits accruing therefrom under 35 U.S.C. § 119, the contents of which are incorporated herein in their entirety by reference.

BACKGROUND

1. Field

The present disclosure relates to a composite, methods of preparing the composite, an electrolyte including the composite, and a lithium secondary battery including the electrolyte.

2. Description of the Related Art

Lithium secondary batteries are high-performance batteries having some of the highest energy density among currently commercially available secondary batteries, and are applicable in various fields such as electric vehicles.

A lithium secondary battery includes polyethylene oxide electrolyte as a polymer electrolyte. The polyethylene oxide electrolyte has a high ionic conductivity at high temperatures, but a low ionic conductivity at room temperatures. There is a need for improving the ionic conductivity at room temperature of the polyethylene oxide polymer electrolyte without deterioration in mechanical properties.

SUMMARY

Provided are composites and methods of preparing the composites.

Provided are electrolytes including the composites.

Provided are lithium secondary batteries that have improved cell performance by inclusion of any of the electrolytes.

Additional aspects will be set forth in part in the description which follows and, in part, will be apparent from the description.

According to an aspect of the present disclosure, a composite includes a metal-organic framework; and an ionic liquid disposed in a pore defined by the metal-organic framework.

According to another aspect of the present disclosure, an electrolyte includes an ion-conductive polymer and the composite.

The electrolyte may further include at least one selected from a liquid electrolyte, a solid electrolyte, a gel electrolyte, a polymer ionic liquid, an inorganic particle, and a separator.

According to another aspect of the present disclosure, a method of preparing the composite includes: mixing the metal-organic framework and the ionic liquid.

According to another aspect of the present disclosure, a lithium secondary battery includes a cathode, an anode, and the electrolyte disposed between the cathode and the anode.

The anode may be a lithium metal electrode or a lithium metal alloy electrode, and the secondary battery may further include at least one selected from a liquid electrolyte, a gel electrolyte, a solid electrolyte, a separator, and a polymer ionic liquid, between the electrolyte and the cathode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
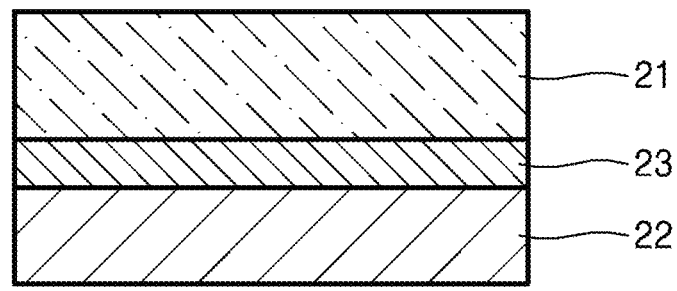
FIGS. 1A to 1E are schematic views illustrating structures of embodiments of lithium secondary batteries, each including an embodiment of an electrolyte.

Reference will now be made in detail to an embodiment of a composite, methods of preparing the composite, and a lithium battery and capacitor including the composite, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers, and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to an embodiment, a composite includes an ionic liquid impregnated into a metal-organic framework.

According to another embodiment, a composite includes an ionic liquid impregnated into a metal-organic framework.

As used herein, the term "impregnated" or "impregnation" refers to that an ionic liquid is present disposed in pores or an empty space of the metal-organic network of the composite.

A polymer electrolyte using polyethylene oxide has a high electrochemical performance at high temperatures of about 60° C. or higher, but a low ionic conductivity at room temperature. To improve the ionic conductivity of the polymer electrolyte, a method of adding an ionic liquid has been suggested. Adding an ionic liquid may improve the ionic conductivity of the polymer electrolyte, but may make the polymer electrolyte sticky or deteriorate mechanical properties thereof. Accordingly, it may be hard to obtain a free-standing polymer electrolyte membrane, or the polymer electrolyte may undergo shape change, thus causing a short circuit and having reduced electrochemical stability. Therefore, adding an appropriate amount of ionic liquid to reach a desired ionic conductivity may not be practically applicable.

To address these drawbacks, the inventors of the present disclosure provide a composite including an ionic liquid that is disposed in a pore defined by the metal-organic framework having a large inner surface area and pores. Using this composite to prepare a polymer electrolyte may prevent mechanical property deterioration in the polymer electrolyte and may hinder crystallization of an ionic-conductive polymer for forming the polymer electrolyte, and thus may improve ionic conductivity and ion mobility and ensure improved electrochemical stability.

The metal-organic framework may be a porous crystalline compound in which a Group 2 to Group 15 metal ion or a Group 2 to Group 15 metal ionic cluster is chemically bonded with an organic ligand. Pores of the metal-organic framework may be filled with the ionic liquid.

The organic ligand refers to an organic group that may form an organic bond such as coordinate bond, ionic bond, or covalent bond. For example, an organic group having at least two binding sites of such metal ions as described above may form a stable structure through binding with the metal ions.

The Group 2 to Group 5 metal ion may be at least one selected from cobalt (Co), nickel (Ni), molybdenum (Mo), tungsten (W), ruthenium (Ru), osmium (Os), cadmium (Cd), beryllium (Be), calcium (Ca), barium (Ba), strontium (Sr), iron (Fe), manganese (Mn), chromium (Cr), vanadium (V), aluminum (Al), titanium (Ti), zirconium (Zr), copper (Cu), zinc (Zn), magnesium (Mg), hafnium (Hf), niobium (Nb), tantalum (Ta), rhenium (Re), rhodium (Rh), iridium (Ir), palladium (Pd), platinum (Pt), silver (Ag), scandium (Sc), yttrium (Y), indium (In), thallium (Tl), silicon (Si), germanium (Ge), tin (Sn), lead (Pb), arsenic (As), antimony (Sb), and bismuth (Bi). The organic ligand may be a group derived from at least one of compounds selected from an aromatic dicarboxylic acid, an aromatic tricarboxylic acid, an imidazole-based compound, a tetrazole, 1,2,3-triazole, 1,2,4-triazole, pyrazole, an aromatic sulfonic acid, an aromatic phosphoric acid, an aromatic sulfinic acid, an aromatic phosphinic acid, a bipyridine, and compounds having at least one functional group selected from an amino group, an imino group, an amide group, a dithio carboxylic acid group (—CS$_2$H), a dithio carboxylate group (—CS$_2^-$), a pyridine group, and a pyrazine group.

Nonlimiting examples of the aromatic dicarboxylic acid and the aromatic tricarboxylic acid are benzene dicarboxylic acid, benzene tricarboxylic acid, biphenyl dicarboxylic acid, and terphenyl-dicarboxylic acid.

For example, the organic ligand may be a group originating from compounds represented by the following formulae.

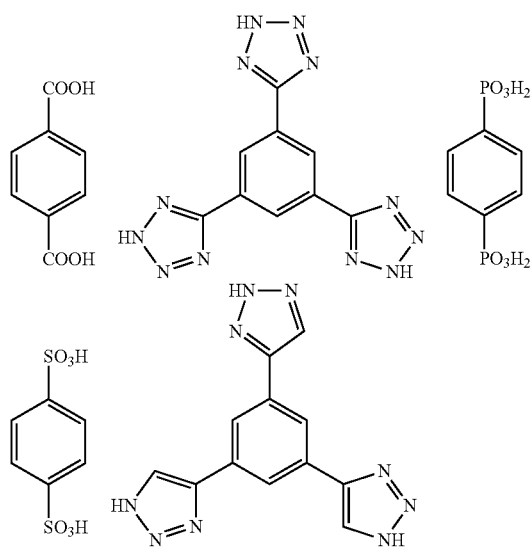

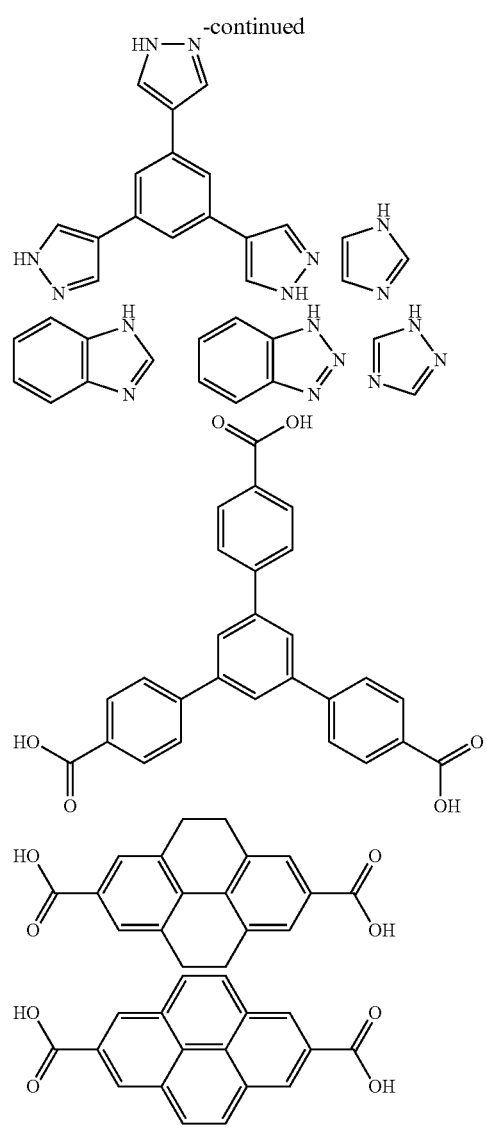

The metal-organic framework may be a compound represented by Formula 1:

$$M_mO_kX_lL_p \qquad \text{Formula 1}$$

In Formula 1, M may be at least one selected from Ti$^{4+}$, Zr$^{4+}$, Mn$^{4+}$, Si$^{4+}$, Al$^{3+}$, Cr$^{3+}$, V$^{3+}$, Ga$^{3+}$, Mn$^{3+}$, Zn$^{+3}$, Mn$^{2+}$, Mg$^{2+}$, Fe$^{2+}$, Fe$^{3+}$, and Cu$^{+2}$, m may be an integer of 1 to 10, k may be 0 or an integer of 1 to 10, l may be 0 or an integer of 1 to 10, p may be an integer of 1 to 10, X may be H, OH$^-$, Cl$^-$, F$^-$, I$^-$, Br$^-$, SO$_4^{2-}$, NO$_3^-$, ClO$_4^-$, PF$_6^-$, BF$_3^-$, R$^1$—(COO)$_n^-$, R$^1$—(SO$_3$)$_n^-$, or R$^1$—(PO$_3$)$_n^-$, where R$^1$ may be at least one selected from a hydrogen and a C1-C30 alkyl group, n may be an integer of 1 to 4, and L may be a ligand of the formula R—(*COO—#)$_q$, including radical R with q carboxylate groups of the formula (*COO—#), wherein q may be an integer of 1 to 6, * may indicate a binding site of the carboxylate group to R, # may indicate a binding site of the carboxylate group to metal ion M, and R may be selected from a substituted or unsubstituted C1-C30 alkyl group, a substituted or unsubstituted C2-C30 alkenyl group, a substituted or unsubstituted C2-C30 alkynyl group, a substituted or unsubstituted monocyclic C6-C30 aryl group, and a substituted or unsubstituted polycyclic C10-C30 aryl group, a substituted or unsubstituted monocyclic C5-C30 heteroaryl group, and a substituted or unsubstituted polycyclic C10-C30 heteroaryl group.

In an embodiment, in Formula 1, m may be 1, 2, 3, or 4, for example, may be 1 or 3; k and l may be each independently 0, 1, 2, 3 or 4, for example, may be 0 or 1; and p may be 1, 2, 3, or 4, for example, may be 1 or 3.

With regard to the radial R of the ligand L, the substituted C1-C30 alkyl group, the substituted C2-C30 alkenyl group, the substituted alkynyl group, the substituted mono- and polycyclic C6-C30 aryl group, and the substituted mono- and polycyclic C3-C30 hetero group may each independently include at least one substituent selected from a C1-C10 alkyl group, a C2-C10 alkenyl group, a C2-C10 alkynyl group, a C3-C10 carbocyclic group, a C1-C10 heteroalkyl group, a C1-C10 haloalkyl group, a C6-C10 aryl group, a C3-C10 heteroaryl group, a C5-C30 heterocyclic group, a C1-C10 alkoxy group, a C6-C10 aryloxy group, a C3-C10 heteroaryloxy group, a C1-C10 alkylthio group, a C1-C10 heteroalkylthio group, a C6-C10 arylthio group, a C3-C10 heteroarylthio group, a halogen atom, —CN, —CF$_3$, —OH, —CHCl$_2$, —CH$_2$OH, —CH$_2$CH$_2$OH, —NH$_2$, —CH$_2$NH$_2$, —COOH, —COONH$_2$, —SO$_3$H, —CH$_2$SO$_2$CH$_3$, —PO$_3$H$_2$, a halogen atom, a C1-C30 alkyl group substituted with a halogen atom (for example, CCF$_3$, CHCF$_2$, CH$_2$F, CCl$_3$, and the like), a C1-C30 alkoxy group, a C2-C30 alkoxyalkyl group, a hydroxy group, a nitro group, a cyano group, an amino group, an amidino group, a hydrazine, a hydrazone, a carboxylic acid group or a salt thereof, a sulfonyl group, a sulfamoyl group, a sulfonic acid group or a salt thereof, a phosphoric acid group or a salt thereof, a C1-C30 alkyl group, a C2-C30 alkenyl group, a C2-C30 alkynyl group, a C1-C30 heteroalkyl group, a C6-C30 aryl group, a C7-C30 arylalkyl group, a C3-C30 heteroaryl group, a C4-C30 heteroarylalkyl group, a C3-C30 heteroaryloxy group, a C3-C30 heteroaryloxyalkyl group, or a C4-C30 heteroarylalkyl group.

The metal-organic framework may be a compound represented by Formula 2:

$$M'_m O_k X'_l L'_p \quad \text{Formula 2}$$

In Formula 2,
M' may be at least one selected from Ti$^{4+}$, Zr$^{4+}$, V$^{3+}$, Zn$^{+3}$, Fe$^{2+}$, Fe$^{3+}$, and Cu$^{+2}$,
L' may be at least one selected from C$_6$H$_4$(CO$_2^-$)$_2$ (terephthalate), C$_2$H$_2$(CO$_2^-$)$_2$ (fumarate), C$_4$H$_4$(CO$_2^-$)$_2$ (muconate), C$_5$H$_3$S(CO$_2^-$)$_2$ (2,5-thiophenedicarboxylate), C$_6$H$_2$N$_2$(CO$_2^-$)$_2$ (2,5-pyrazine dicarboxylate), C$_2$H$_4$(CO$_2^-$)$_2$ (succinate), C$_3$H$_6$(CO$_2^-$)$_2$ (glutarate), C$_4$H$_8$(CO$_2^-$)$_2$ (adipate), C$_{10}$H$_6$(CO$_2^-$)$_2$ (naphthalene-2,6-dicarboxylate), C$_{12}$H$_8$(CO$_2^-$)$_2$ (biphenyl-4,4'-dicarboxylate), C$_{12}$H$_8$N$_2$(CO$_2^-$)$_2$ (azobenzenedicarboxylate), C$_6$H$_3$(CO$_2^-$)$_3$ (benzene-1,2,4-tricarboxylate orbenzene-1,3,5-tricarboxylate), C$_{24}$H$_{15}$(CO$_2^-$)$_3$ (benzene-1,3,5-tribenzoate), C$_6$H$_2$(CO$_2^-$)$_4$ (benzene-1,2,4,5-tetracarboxylate), C$_{10}$H$_4$(CO$_2^-$)$_4$ (naphthalene-2,3,6,7-tetracarboxylate or, naphthalene-1,4,5,8-tetracarboxylate), and C$_{12}$H$_6$(CO$_2^-$)$_4$ (biphenyl-3,5,3',5'-tetracarboxylate),
X' may be at least one selected from OH$^-$, Cl$^-$, F$^-$, CH$_3$COO$^-$, PF$_6^-$, and ClO$_4^-$,
m may be an integer of 1 to 8;
k may be 0 or an integer of 1 to 8;
l may be 0 or an integer of 1 to 8; and
p may be an integer of 1 to 8.

The metal-organic framework may be at least one selected from Ti$_8$O$_8$(OH)$_4$[O$_2$C—C$_6$H$_4$—CO$_2$]$_6$, Ti$_8$O$_8$(OH)$_4$[O$_2$C—C$_6$H$_3$(NH$_2$)—CO$_2$]$_6$, VO[C$_6$H$_4$(CO$_2$)$_2$], Al(OH)[C$_6$H$_4$(CO$_2$)$_2$], Cr(OH)[C$_6$H$_4$(CO$_2$)$_2$], Al(OH)[C$_{10}$H$_6$(CO$_2$)$_2$], Cr$_3$OX$_l$[C$_6$H$_4$(CO$_2$)$_2$]$_3$ (where X may be at least one selected from H, OH$^-$, Cl$^-$, F$^-$, CH$_3$COO$^-$, PF$_6^-$, and ClO$_4^-$, and l may be 0 or an integer of 1 to 8), Cr$_3$OX$_l$[C$_{12}$H$_8$(CO$_2$)$_2$]$_3$ (where X may be at least one selected from —H, OH$^-$, Cl$^-$, F$^-$, CH$_3$COO$^-$, PF$_6^-$, and ClO$_4^-$, and l may be 0 or an integer of 1 to 8), Cr$_3$OX$_l$[C$_6$H$_3$(CO$_2$)$_3$]$_3$ (where X may be at least one selected from H, OH$^-$, Cl$^-$, F$^-$, CH$_3$COO$^-$, PF$_6^-$, and ClO$_4^-$, and l may be 0 or an integer of 1 to 8), Al$_8$(OH)$_{15}$(H$_2$O)$_3$[C$_6$H$_3$(CO$_2$)$_3$]$_3$, V$_3$OX$_l$[C$_6$H$_3$(CO$_2$)$_3$]$_3$ (where X may be at least one selected from H, OH$^-$, Cl$^-$, F$^-$, CH$_3$COO$^-$, PF$_6^-$, and ClO$_4^-$, and l may be 0 or an integer of 1 to 8), and ZrO[C$_6$H$_4$(CO$_2$)$_2$].

For example, the metal-organic framework may be Ti$_8$O$_8$(OH)$_4$[O$_2$C—C$_6$H$_4$—CO$_2$]$_6$, Cu(bpy)(H$_2$O)$_2$(BF$_4$)$_2$(bpy) (where "bpy" indicates 4,4'-bipyridine), Zn$_4$O(O$_2$C—C$_6$H$_4$—CO$_2$)$_3$ (Zn-terephthalic acid-MOF, Zn-MOF), or Al(OH){O$_2$C—C$_6$H$_4$—CO$_2$}.

In some embodiments, the metal-organic framework may include a plurality of primary particles having a uniform size that do not agglomerate together in an ion-conductive polymer matrix of a polymer electrolyte. A metal-organic framework having these characteristics may be useful as a support for the ionic liquid of the composite.

In some embodiments, the metal-organic framework may have a uniform particle size represented by Equation 1, for example, with a narrow size distribution of particles concentrating on an average particle diameter. An electrolyte including a metal-organic framework having such a uniform particle size may have improved mechanical properties, and may reduce crystallinity of a polymer matrix for forming the polymer electrolyte, thus having an improved ionic conductivity at room temperature and improved electrochemical stability.

$$0.0 < \sigma^2/\mu < 1.0 \quad \text{Equation 1}$$

In Equation 1, $\sigma^2$ indicates a variance of primary particle diameters of the metal-organic framework, as measured using dynamic laser scattering, which is equivalent to a square value of a standard deviation of average particle diameters of the primary particles of the metal-organic frame work, and p indicates an average particle diameter of the plurality of primary particles.

The primary particles of the metal-organic framework may have an average particle diameter of about 1 nm to about 1 μm, and in some embodiments, about 10 nm to about 900 nm, and in some other embodiments, about 100 nm to about 800 nm, and in some other embodiments, about 300 nm to about 500 nm. The primary particles may have any of a variety of shapes, including a spherical shape, an elliptical shape, a cylindrical shape, a triangular shape, a square shape, or a polyhedral shape. The plurality of primary particles may have any one of the above-listed shaped. For example, the plurality of primary particles may be spherical.

Hereinafter, a method of preparing a metal-organic framework, according to an embodiment of the present disclosure will be described.

A metal-organic framework may be prepared using a metal-organic framework composition including a metal ion precursor, an organic ligand precursor, and a solvent by a hydrothermal synthesis method, a microwave or ultrasonic synthesis method, or an electrochemical synthesis method.

The metal-organic framework composition may include an organic ligand precursor and a metal ion precursor in a stoichiometric ratio.

Non-limiting examples of the metal ion precursor are titanium isopropoxide, titanium ethoxide, titanium butoxide, aluminum nitrate, and the like. Non-limiting examples of the organic ligand precursor are 1,4-benzene-dicarboxylic acid, 1,3,5-benzene tricarboxylic acid, biphenyl dicarboxylic acid, terphenyl-dicarboxylic acid, and the like. The solvent may be, for example, ethanol, N,N-dimethyl formamide, tetrahydrofuran, methylethyl ketone, acetonitrile, methylene chloride or a mixture thereof. The amount of the solvent may be in a range of about 100 parts to about 3,000 parts by weight based on 100 parts by weight of a total weight of the metal-organic framework.

To obtain a metal-organic framework having a uniform particle size as represented by Equation 1, the amount of the organic ligand precursor may be greater than a stoichiometric amount with respect to the amount of the metal ion precursor in preparing a metal-organic framework composition. For example, the amount of the organic ligand precursor may be in a range of about 1.3 moles to about 100 moles, and in some embodiments, about 1.5 moles to about 50 moles, and in some other embodiments, about 1.3 moles to about 20 moles, based on 1 mole of the metal ionic precursor. When the amount of the organic ligand precursor is within these ranges, the metal-organic framework may be uniformly distributed in an ion-conductive polymer matrix of a polymer electrolyte, and thus form the polymer electrolyte having high ionic conductivity without deterioration in mechanical characteristics.

In some embodiments, the metal-organic framework may be obtained by thermally treating the metal-organic framework composition at a temperature of about 50° C. to about 500° C. and then by work-up. However, the thermal treatment condition is not limited to the above.

In some embodiments, the reaction product may further be thermally treated at a temperature of about 100° C. to about 1200° C., if desired.

An ionic liquid refers to a salt in a liquid state at room temperature or a fused salt at room temperature that consists of only ions having a melting point equal to or below room temperature. The ionic liquid of any of the composites according to the above-described embodiments may be at least one selected from compounds each including i) a cation of at least one selected from an ammonium, a pyrrolidinium, a pyridinium, a pyrimidinium, an imidazolium, a piperidinium, a pyrazolium, an oxazolium, a pyridazinium, a phosphonium, a sulfonium, and a triazolium, and ii) at least one anion selected from $BF_4^-$, $PF_6^-$, $AsF_6^-$, $SbF_6^-$, $AlCl_4^-$, $HSO_4^-$, $ClO_4^-$, $Cl^-$, $Br^-$, $I^-$, $CF_3SO_3^-$, $CF_3CO_2^-$, $NO_3^-$, $Al_2Cl_7^-$, $CH_3COO^-$, $CH_3SO_3^-$, $(CF_3SO_2)_3C^-$, $(CF_3CF_2SO_2)_2N^-$, $(CF_3SO_2)_2N^-$, $(FSO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(C_2F_5SO_2)(CF_3SO_2)N^-$ and $(O(CF_3)_2C_2(CF_3)_2O)_2PO^-$.

For example, the ionic liquid may be at least one selected from N-methyl-N-propylpyrrolidiniumbis(trifluoromethanesulfonyl)imide, N-butyl-N-methylpyrrolidinium bis(trifluoromethylsulfonyl)imide, 1-butyl-3-methylimidazolium bis(trifluoromethylsulfonyl)imide, and 1-ethyl-3-methylimidazolium bis(trifluoromethylsulfonyl)imide.

The ionic liquid may be impregnated into, or disposed in a pore defined by, the above-described metal-organic framework so as not to hinder migration of lithium ions.

The metal-organic framework is not limited to a particular shape, and may have any of a variety of forms, including, for example, powder, for example, including power, thin film, membrane, pellet, slurry, paste, paint, bead, honeycomb, mesh, fiber, corrugated sheet, rotor, and the like.

The metal-organic framework may have a size of about 1 nanometer (nm) to about 1 micrometer (μm), for example, about 10 nm to about 800 nm, about 100 nm to about 500 nm, or about 200 nm to about 400 nm. As used herein, the term "size' of the metal-organic framework may refer to a diameter if the metal-organic framework is spherical or a length of a largest side if the metal-organic framework has a non-spherical structure. The metal-organic framework may have a specific surface area of about 100 square meters per gram ($m^2/g$) or greater, and in some embodiments, about 500 $m^2/g$ or greater, and in some other embodiments, about 100 $m^2/g$ to about 4500 $m^2/g$, about 200 $m^2/g$ to about 4000 $m^2/g$, or about 400 $m^2/g$ to about 3000 $m^2/g$.

The metal-organic framework may have a pore size of about 0.1 nm to about 10 nm, about 0.5 nm to about 8 nm, for example, about 1 nm to about 6 nm. As used herein, the term "pore size" may refer to a diameter of a pore if the metal-organic framework includes a spherical pore or a length of a largest side of a pore if the metal-organic framework includes a non-spherical pore.

In some embodiments, the amount of the ionic liquid of the composite may be in a range of about 0.1 parts to about 50 parts by weight, and in some other embodiments, about 1 part to about 20 parts by weight, and in some other embodiments, about 1 part to about 10 parts by weight, based on 100 parts by weight of a total weight of the composite (including the ionic liquid and the metal-organic framework). When the amount of the ionic liquid is within these ranges, an electrolyte having high ionic conductivity without deterioration in mechanical characteristics may be obtained.

In the composites according to the above-described embodiments, the presence of the ionic liquid in the metal-organic framework may be identified by infrared ray (IR) analysis, thermogravimetric analysis (TGA), or the like, after removing all components from the surface of the composite. In the removing of all components from the surface of the composite, components of the ionic liquid that are simply mixed with the composite may be removed and the remaining ionic liquid may be in the pores or empty spaces of an metal-organic framework. In the removing of the components from the surface of the composite, an organic solvent such as tetrahydrofuran, acetonitrile, or the like may be used.

In some embodiments, the composite may further include an additional metal-organic framework. The metal-organic framework may be, for example, any metal-organic framework known in the art.

In some embodiments, the composite may further include at least one selected from an alkali metal salt and an alkaline earth metal salt disposed in a pore defined by the metal-organic framework. For example, the composite may further include at least one selected from an alkali metal salt and an alkaline earth metal salt impregnated into the metal-organic framework.

In some embodiments, the composite may further include at least one selected from an alkali metal salt and an alkaline earth metal salt. The at least one selected from an alkali metal salt and an alkali earth metal salt may optionally be impregnated in the metal-organic framework.

According to another embodiment, an electrolyte includes any of the composites according to the above-described embodiments and an ion-conductive polymer.

The electrolyte as an organic-inorganic composite electrolyte including a composite in which a metal-organic framework having a large specific surface area is impregnated with an ionic liquid may have an improved conductivity, for example, an improved ionic conductivity at room temperature (about 20° C.-25° C.), and improved mechanical characteristics due to the inclusion of the metal-organic framework serving as a filler. The use of the composite including the metal-organic framework impregnated with the ionic liquid may prevent deterioration in mechanical properties and electrochemical stability of the electrolyte. Accordingly, the electrolyte may be formed to be thin, for example, as a flexible free-standing membrane. When added into an electrolyte, any of the composites according to the above-described embodiments may improve mechanical properties of the electrolyte, though it is impregnated with the ionic liquid, by serving as a filler. The electrolyte may be used as a lithium-anode protective membrane, and thus may prevent a fire which might otherwise be caused by a carbonate-based liquid electrolyte.

In some embodiments, the amount of the composite in the electrolyte is in a range of about 0.1 parts to about 60 parts by weight, based on 100 parts by weight of a total weight of the electrolyte (including the ion-conductive polymer and the composite). When the amount of the composite is within this range, the electrolyte may be improved in ionic conductivity and ion mobility without deterioration in mechanical characteristics.

The ion-conductive polymer is a polymer that forms a polymer matrix for the electrolyte and includes an ion-conductive repeating unit in a backbone or a side chain. Examples of the ion-conductive repeating unit are an alkylene oxide unit such as ethylene oxide, and a hydrophilic unit.

The ion-conductive polymer of the electrolyte may include at least one ion-conductive repeating unit such as an ether-unit, for example a C2-C4 alkylene oxide unit, an acryl unit derived from acrylic acid or a C1-C12 alkyl ester of acrylic acid (e.g., methyl acrylate, ethyl acrylate, or 2-ethylhexyl acrylate), a methacryl unit derived from methacrylic acid or a C1-C12 alkyl ester of methacrylic acid (e.g., methyl methacrylate, ethyl methacrylate, or 2-ethylhexyl methacrylate, an ethylene acetate unit derived from vinyl acetate, and a siloxane unit. Other units can be present, for example unites derived from a C2-C4 alkylene such as ethylene. For example, the ion-conductive polymer may be at least one selected from polyethylene oxide, polypropylene oxide, polymethyl methacrylate, polyethyl methacrylate, polydimethyl siloxane, polyacrylic acid, polymethacrylic acid, polymethyl acrylate, polyethyl acrylate, poly-2-ethylhexyl acrylate, polybutyl methacrylate, poly-2-ethylhexyl methacrylate, polydecyl acrylate, and polyethylene vinyl acetate.

In some embodiments, the ion-conductive polymer of the electrolyte may be a polymerization product of crosslinkable monomers having ionic conductivity. Non-limiting examples of the crosslinkable monomers are ethoxylated trimethylolpropane triacrylate, polyethyleneglycol diacrylate, and polyethyleneglycol dimethacrylate.

In some other embodiments, the ion-conductive polymer may be a polymer ionic liquid such as polydiallyldimethyl ammonium bis(trifluoromethanesulfonyl)imide.

The ion-conductive polymer may be a copolymer including an ion-conductive repeating unit and a structural repeating unit. The copolymer may be any polymer, for example, a block copolymer, a random copolymer, an alternating copolymer, and a graft copolymer.

The ion-conductive repeating unit of the ion-conductive polymer is responsible for the ionic conductivity of the copolymer. The ion-conductive repeating unit may be derived from, but not limited to, at least one monomer selected from acrylic acid, methacrylic acid, methyl acrylate, methyl methacrylate, ethyl acrylate, ethyl methacrylate, 2-ethylhexyl acrylate, butyl methacrylate, 2-ethylhexyl methacrylate, decyl acrylate, ethylene vinyl acetate, ethylene oxide, and propylene oxide. For example, the ion-conductive repeating unit may be ethoxylated trimethylolpropane triacrylate (ETPTA).

The structural repeating unit of the ion-conductive polymer is responsible for the mechanical properties of the copolymer. The structural repeating unit may be derived from, but not limited to, at least one monomer selected from styrene, 4-bromostyrene, tert-butyl styrene, divinyl benzene, methyl methacrylate, isobutyl methacrylate, butadiene, ethylene, propylene, dimethyl siloxane, isobutylene, N-isopropylacrylamide, vinylidene fluoride, acrylonitrile, 4-methyl-1-pentene-, butylene terephthalate, ethylene terephthalate, and vinyl pyridine.

A mixed mole ratio of the ion-conductive repeating unit to the structural repeating unit in the copolymer may be in a range of about 0.1:99.9 to about 99.9:0.1, about 1:99 to about 99:1, or for example from about 10:90 to about 90:10.

In some embodiments, the ion-conductive polymer may be a block copolymer including an ion-conductive domain and a structural domain. The ionic conductivity domain contributes to ionic conductivity of the block copolymer, and the structural domain contributes to mechanical properties of the block copolymer.

The ionically conductive domain may have a size of about 10 nm to about 300 nm, for example, about 10 nm to about 100 nm. Such sizes of the ionically conductive domain may be identified by transmission electron microscopy or small-angle X-ray scattering (SAXS). For example, the size of the ionic conductive domain may be obtained by SAXS using a q scattering angle of a Bragg's scattering peak in each domain. When the size of the ionic conductivity domain is within these ranges, an electrolyte with an improved ionic conductivity may be obtained.

The ionically conductive domain may include a polymer block that includes an ion-conductive repeating unit. This polymer block may have a weight average molecular weight of about 10,000 Daltons or greater, and in some embodiments, about 10,000 to about 500,000 Daltons, and in some other embodiments, about 15,000 to about 100,000 Daltons. When the polymer block has a weight average molecular weight within these ranges, a degree of polymerization of the block copolymer may be within an appropriate range, and thus a polymer electrolyte with an improved ionic conductivity may be obtained using the block copolymer.

The structural domain may include a polymer block that includes a structural repeating unit. This polymer block may have a weight average molecular weight of about 10,000 Daltons or greater, and in some embodiments, about 10,000 to about 500,000 Daltons, and in some other embodiments, about 15,000 to about 400,000 Daltons or greater.

The amount of the polymer block of the structural domain may be in a range of about 20 parts to about 45 parts by weight, based on 100 parts by weight of a total weight of the block copolymer. When the polymer block of the structural domain has a weight average molecular weight within these ranges, a polymer electrolyte with improved mechanical properties and improved ionic conductivity may be obtained using the polymer block.

In some embodiments, the block copolymer as an ion-conductive polymer of the electrolyte may be a linear or branched block copolymer. The linear block copolymer may be in any form, for example, lamellar, cylindrical, or gyroid form.

Non-limiting examples of the branched block copolymer are a graft polymer, a star-shaped polymer, a comb polymer, a brush polymer, and the like.

The block copolymer may be at least one selected from a diblock copolymer (A-B) and a triblock copolymer (A-B-A' or B-A-B'), wherein the blocks A and A' may include conductive polymer units, wherein each block may be independently at least one selected from polyethylene oxide, polypropylene oxide, polysiloxane, polyethylene oxide-grafted polymethyl methacrylate (PEO-grafted PMMA), and polysiloxane-grafted PMMA. The blocks B and B' may include structural polymer units, wherein each block may be independently selected from polystyrene (PS), polydivinyl benzene, polymethyl methacrylate, polyvinyl pyridine, polyimide, polyethylene, polypropylene, polyvinylidene fluoride, polyacrylonitrile, and polydimethylsiloxane.

A polymer including the above-described structural repeating unit may be at least one selected from polystyrene, hydrogenated polystyrene, polymethacrylate, poly(methyl methacrylate), polyvinylpyridine, polyvinyl cyclohexane, polyimide, polyamide, polyethylene, polyisobutylene, polybutylene, polypropylene, poly(4-methyl pentene-1), poly(butylene terephthalate), poly(isobutyl methacrylate), poly(ethylene terephthalate), polydimethylsiloxane, polyacrylonitrile, polymaleic acid, polymaleic anhydride, polyamide, polymethacrylic acid, poly(tert-butylvinylether), poly(cyclohexyl methacrylate), poly(cyclohexyl vinylether), polyvinyl idene fluoride, and polydivinylbenzene, or may be a copolymer including at least two repeating units of these polymers.

In some embodiments, the block copolymer as an ion-conductive polymer of the electrolyte may include polyethylene oxide-b-polystyrene (PEO-b-PS), (polyethylene oxide-b-polystyrene-b-polyethylene oxide) (PEO-b-PS-b-PEO), (polystyrene-b-polyethylene oxide-b-polystyrene) (PS-b-PEO-b-PS), polyethylene oxide-b-polymethylmethacrylate (PEO-b-PMMA), or polyethylene oxide-b-(polystyrene-co-divinylbenzene) {PEO-b-(PS-co-DVB)}.

When the block copolymer is an A-B-A' or B-A-B' triblock copolymer including a first block A, a second block B, and a third block B', the amounts of the first and third blocks A and A' or B and B' may be each independently in a range of about 14.5 parts to about 17.85 parts by weight based on 100 parts by weight of a total weight of the block copolymer, and the amount of the second block may be in a range of about 64.3 parts to about 71.0 parts by weight based on 100 parts by weight of the total weight of the block copolymer.

When the block copolymer is an A-B diblock copolymer including a first block A and a second block B, the amount of the first block A may be in a range of about 29 parts to about 35.7 parts by weight based on 100 parts by weight of a total weight of the block copolymer, and the amount of the second block B may be in a range of about 64.3 parts to about 71.0 parts by weight based on 100 parts by weight of the total weight of the block copolymer.

In some embodiments, the block copolymer may be a polystyrene-b-(polyethylene oxide)-b-polystyrene block copolymer in a weight ratio of about 10:36:10 (or about 17.85:64.3:17.85) or about 12:59:12 (or about 14.5:71:14.5) of polystyrene:polyethylene oxide:polystyrene.

In some embodiments, the electrolyte may further include at least one salt selected from an alkali metal salt and an alkaline earth metal salt. The at least one salt selected from an alkali metal salt and an alkaline earth metal salt may be mixed with or impregnated into the metal-organic frame of the composite. The inclusion of the at least one salt selected from an alkali metal salt and an alkaline earth metal salt in the metal-organic framework of the composite may facilitate migration of lithium ions, and thus enable the manufacture of an electrolyte having improved mechanical characteristics without deterioration in ionic conductivity and lithium ion mobility. When the electrolyte further includes at least one selected from an alkali metal salt and an alkaline earth metal salt, the electrolyte may have improved ionic conductivity.

According to any of the embodiments, the composite may be less expensive than a composite including a mesoporous silica and an ionic liquid. The mesoporous silica is commercially available under the trade name of MCM-41 (available from ACS material) or MCM-48 (available from ACS material)

The amount of the at least one selected from the alkali metal salt and the alkaline earth metal salt may be controlled to have a mole ratio of about 1:5 to about 1:30, for example, about 1:10 to about 1:20, with respect to an ion-conductive unit of the ion-conductive polymer. For example, the ion-conductive unit may be an ethylene oxide unit. When the amount of the at least one selected from the alkali metal salt and the alkaline earth metal salt is within these ranges, the electrolyte may have high ionic conductivity. Non-limiting examples of the alkali metal salt or alkaline earth metal salt are chlorides, hydrides, nitrides, phosphides, sulfonamides, triflates, thiocyanates, perchlorates, borates, or selenides each including an alkali metal or an alkaline earth metal. Non-limiting examples of the alkali metal or alkaline earth metal are lithium, sodium, potassium, barium, and calcium.

For example, the alkali metal salt or alkaline earth metal salt may be at least one selected from $LiSCN$, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2F)_2$, $LiN(SO_2CF_2CF_3)_2$, $LiSbF_6$, $LiPF_3(CF_2CF_3)_3$, $LiPF_3(CF_3)_3$, $LiB(C_2O_4)_2$, $NaSCN$, $NaSO_3CF_3$, $KTFSI$, $NaTFSI$, $Ba(TFSI)_2$, $Pb(TFSI)_2$, and $Ca(TFSI)_2$. For example, the alkali metal salt or alkaline earth metal salt may be at least one lithium salt selected from $LiClO_4$, $LiCF_3SO_3$, $LiBF_4$, $LiN(CF_3SO_2)_2$, $LiN(FSO_2)_2$, $LiPF_6$, $LiAsF_6$, $LiSbF_6$, and $LiPF_3(CF_2CF_3)_3$.

In some embodiments, the electrolyte may further include an ionic liquid. When the electrolyte includes an ionic liquid (IL) and a lithium salt (Li), a mole ratio (IL/Li) of the ionic liquid to lithium ions may be in a range of about 0.1 to about 2.0, for example, about 0.2 to about 1.8, and in some other embodiments, about 0.4 to about 1.5. When the electrolyte has a mole ratio of the ionic liquid to lithium ions within these ranges, the electrolyte may have high lithium ion mobility, high ionic conductivity, and improved mechanical properties to effectively suppress growth of lithium dendrite on an anode surface of a secondary battery.

When the electrolyte includes an ionic liquid and a lithium salt, a mixed mole ratio of lithium to ethylene oxide may be in a range of about 1:5 to about 1:30. The electrolyte may further include inorganic particles of at least one selected from $SiO_2$, $TiO_2$, $ZnO$, $Al_2O_3$, $BaTiO_3$, and a metal-organic framework (MOF). When the electrolyte includes such inorganic particles, the electrolyte may have improved mechanical properties.

The inorganic particles may have an average particle diameter of about 10 nm or less, and in some embodiments, about 5 nm or less, and in some other embodiments, about 0.01 nm to about 10 nm, about 0.1 nm to about 5 nm, or about 0.2 nm to about 3 nm.

In some embodiments, the electrolyte may include a composite according to any of the above-described embodiments that includes a metal-organic framework and an ionic liquid impregnated into the metal-organic framework and ion-conductive polymer. When the electrolyte has this structure in which an ionic liquid is disposed in a pore formed by a metal-organic framework, the electrolyte may have improved mechanical properties to suppress the growth of lithium dendrite, and improved lithium ion mobility and improved ionic conductivity.

In some other embodiments, the electrolyte may include a metal-organic framework, an ionic liquid, and an ion-conductive polymer, wherein the metal-organic framework and the ionic liquid are present independent from each other. The amount of the ionic liquid may be in a range of about 0.1 parts to about 50 parts by weight based on 100 parts by weight of a total weight of the metal-organic framework and the ionic liquid. The total amount of the metal-organic framework and the ionic liquid may be in a range of about 0.1 parts to about 60 parts by weight based on a total weight of the electrolyte (including the metal-organic framework, the ionic liquid, and the ion-conductive polymer).

The electrolyte including a metal-organic framework, an ionic liquid, and an ion-conductive polymer, wherein the metal-organic framework and the ionic liquid are present independent from each other, may further include at least one selected from an alkali metal salt and an alkaline earth metal salt as described above. The amount of the at least one selected from an alkali metal salt and an alkaline earth metal salt may be the same as that used in the electrolyte including a composite according to any of the above-described embodiments.

According to another embodiment of the present disclosure, a method of preparing a composite according to any of the above-described embodiments includes mixing the metal-organic framework and the ionic liquid under a condition effective to adjust a viscosity of the ionic liquid, in particular to decrease the viscosity of the ionic liquid, without decomposition of the ionic liquid, to obtain the composite in which the metal-organic framework is impregnated with the ionic liquid.

In some embodiments, the mixing may be performed in a vacuum condition at a temperature that is equal to or lower than a boiling point of the ionic liquid and is equal to and higher than a melting point of the ionic liquid. When the mixing is performed within this temperature range in a vacuum, the ionic liquid may be sufficiently impregnated into pores of the metal-organic framework not to be decomposed.

The viscosity of the ionic liquid may be selected to be in a range of, for example, about 0.1 poise to about 5,000 poise, about 1 poise to about 4,000 poise, or about 5 poise to about 3,000 poise. When the viscosity of the ionic liquid is adjusted to be within this range, it may become easier to impregnate the ionic liquid into the metal-organic framework.

In some embodiments, the mixing of the metal-organic framework and the ionic liquid may be performed in a vacuum at a temperature of about 50° C. to about 200° C., for example, at about 60° C. to about 80° C.

An electrolyte including the composite prepared by the above-described method may represent a major peak ranging from about 3° to about 15° at a diffraction peak (Bragg angle) 2θ with respect to CuK-α X-ray wavelength of 1.541 Å. In view of this diffraction peak pattern, the metal-organic framework is found to retain its original structure in the electrolyte even when impregnate with the ionic liquid.

The presence of the ionic liquid in the electrolyte according to any of the above-described embodiments may be identified by thermogravimetric analysis (TGA). When analyzed by TGA, the electrolyte prepared using the ionic liquid-impregnated metal-organic framework is found to undergo a large weight loss in a predetermined temperature range, unlike a metal-organic framework, indicating that such a weight loss occurs due to the ionic liquid. The predetermined temperature range in which the weight loss occurred is equivalent to a decomposition temperature range of the ionic liquid, and may be, for example, about 300° C. to about 400° C., though which may vary depending on, for example, the type or amount of the ionic liquid.

A weight loss range of the electrolyte may be, for example, about 1 wt % to about 15 wt %, based on 100 wt % of a total weight of the electrolyte.

The presence of the ionic liquid in the electrolyte according to any of the above-described embodiments may also be identified by infrared ray (IR) analysis. The presence or not of a functional group of the ionic liquid may be identified by IR analysis.

In some embodiments, the electrolyte may further include at least one selected from a liquid electrolyte, a solid electrolyte, a gel electrolyte, a polymer ionic liquid, an inorganic particle, and a separator. In other words, the electrolyte may be a mixed electrolyte that further includes at least one selected from a liquid electrolyte, a solid electrolyte, a gel electrolyte, a polymer ionic liquid, an inorganic particle, and a separator.

The liquid electrolyte may further include at least one selected from an organic solvent, an ionic liquid, an alkali metal salt, and an alkaline earth metal salt.

Non-limiting examples of the organic solvent are a carbonate-based compound, a glyme-based compound, and a dioxolane-based compound.

Non-limiting examples of the carbonate-based solvent are ethylene carbonate, propylene carbonate, dimethyl carbonate, fluoroethylene carbonate, diethyl carbonate, or ethylmethyl carbonate. The glyme-based solvent may be, for example, at least one selected from poly(ethylene glycol) dimethyl ether (PEGDME, polyglyme), tetra(ethylene glycol)dimethyl ether (TEGDME, tetraglyme), tri(ethylene glycol)dimethyl ether (triglyme), poly(ethylene glycol) dilaurate (PEGDL), poly(ethylene glycol)monoacrylate (PEGMA), and poly(ethylene glycol)diacrylate (PEGDA).

The dioxolane-based compound may be, for example, at least one selected from 1,3-dioxolane, 4,5-diethyl-1,3-dioxolane, 4,5-dimethyl-1,3-dioxolane, 4-methyl-1,3-dioxolane, and 4-ethyl-1,3-dioxolane. In some other embodiments, the organic solvent may be 2,2-dimethoxy-2-phenyl acetophenone, diethoxy ethane, tetrahydrofuran, or gamma-butyrolactone The polymer ionic liquid may be, for example, a polymerization product of ionic liquid monomers, or a polymeric compound. The polymer ionic liquid is highly dissoluble in an organic solvent, and thus may further improve the ionic conductivity of the electrolyte when further added.

In preparing a polymer ionic liquid by polymerization of ionic liquid monomers as described above, the resulting product from polymerization reaction may be washed and dried, followed by anionic substitution reaction to obtain appropriate anions that may improve solubility of the polymerization product in an organic solvent.

In some embodiments, the polymer ionic liquid may include a repeating unit that includes i) a cation of at least one selected from an ammonium, a pyrrolidinium, a pyridinium, a pyrimidinium, an imidazolium, a piperidinium, a pyrazolium, an oxazolium, a pyridazinium, a phosphonium, a sulfonium, and a triazolium, and ii) at least one anion selected from $BF_4^-$, $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $(CF_3SO_2)_2N^-$, $NO_3^-$, $Al_2Cl_7^-$, $AsF_6^-$, $SbF_6^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_6PF^-$, $(CF_3)_6P^-$, $SF_6CF_2SO_3^-$, $SF_5CHFCF_2SO_3^-$, $CF_3CF_2(CF_3)_2CO_3^-$, $(CF_3SO_2)_2CH^-$, $(SF_5)_3C^-$, and $(O(CF_3)_2C_2(CF_3)_2O)_2PO^-$.

In some embodiments, the polymer ionic liquid may be prepared by polymerization of ionic liquid monomers. These ionic liquid monomers may have a functional group polymerizable with a vinyl group, an allyl group, an acrylate group, and a methacrylate group, and may include a cation of at least one selected from ammonium, pyrrolidinium, pyridinium, pyrimidinium, imidazolium, piperidinium, pyrazolium, oxazolium, pyridazinium, phosphonium, sulfonium, triazole, and mixtures thereof, and at least one of the above-listed anions.

Non-limiting examples of the ionic liquid monomers are 1-vinyl-3-ethylimidazolium bromide, a compound represented by Formula 3, or a compound represented by Formula 4.

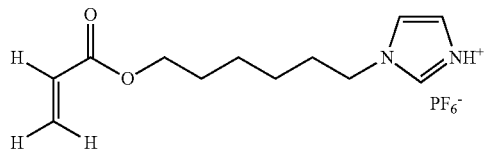

Formula 3

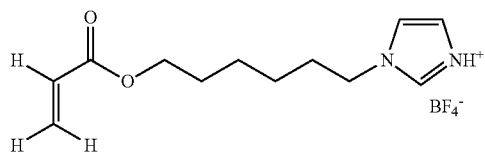

Formula 4

For example, the polymer ionic liquid may be a compound represented by Formula 5 or a compound represented by Formula 6.

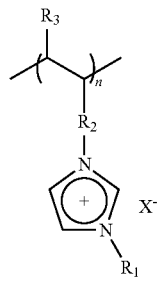

Formula 5

In Formula 5, $R_1$ and $R_3$ may be each independently a hydrogen, a substituted or unsubstituted C1-C30 alkyl group, a substituted or unsubstituted C2-C30 alkenyl group, a substituted or unsubstituted C2-C30 alkynyl group, a substituted or unsubstituted C6-C30 aryl group, a substituted or unsubstituted C2-C30 heteroaryl group, or a substituted or unsubstituted C4-C30 carbocyclic group; $R_2$ may be a simple chemical bond, a C1-C3 alkylene group, a C6-C30 arylene group, a C2-C30 heteroarylene group, or a C4-C30 carbocyclic divalent group; and $X^-$ may indicate an anion of the ionic liquid.

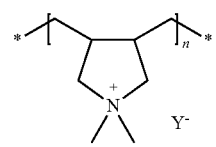

Formula 6

In Formula 6, $Y^-$, which indicates the same as $X^-$ in Formula 5, may be, for example, bis(trifluoromethanesulfonyl)imide (TFSI), $BF_4$, or $CF_3SO_3$; and n may be in a range of 500 to 2800.

The polymer ionic liquid may include a cation selected from poly(1-vinyl-3-alkylimidazolium), poly(1-allyl-3-alkylimidazolium), poly(1-(methacryloyloxy-3-alkylimidazolium), and an anion selected from $CH_3COO^-$, $CF_3COO^-$, $CH_3SO_3^-$, $CF_3SO_3^-$, $(CF_3SO_2)_2N^-$, $(CF_3SO_2)_3C^-$, $(CF_3CF_2SO_2)_2N^-$, $C_4F_9SO_3^-$, $C_3F_7COO^-$, and $(CF_3SO_2)(CF_3CO)N^-$. For example, the compound of Formula 6 may be polydiallyldimethyl ammonium bis(trifluoromethanesulfonyl)imide. Here, the alkyls of the poly(1-vinyl-3-alkylimidazolium), the poly(1-allyl-3-alkylimidazolium) and poly(1-methacryloyloxy-3-alkylimidazolium may be a C1-C10 alkyl group. The C1-C10 alkyl group includes methyl, ethyl, propyl, butyl, isobutyl, or pentyl group.

In some embodiments, the polymer ionic liquid may include a low-molecular weight polymer, a thermally stable ionic liquid, and a lithium salt. The low-molecular weight polymer may have an ethylene oxide chain. The low-molecular weight polymer may be a glycol ether, also known as a glyme. Non-limiting examples of the glyme are polyethyleneglycol dimethylether (polyglyme), tetraethyleneglycol dimethyl ether (tetraglyme), and triethyleneglycol dimethylether (triglyme). The low-molecular weight polymer may have a weight average molecular weight of about 75 to about 2000, for example, a weight average molecular weight of about 250 to about 500.

The thermally stable ionic liquid may be the same as those listed above in conjunction with the above-described ionic liquid. The lithium salt may be any of the compounds described above as alkali metal salts as long as it includes lithium as an alkali metal.

When the electrolyte further includes a gel electrolyte, the electrolyte may have further improved conductivity. The gel electrolyte may be any electrolyte in gel form known in the art.

For example, the gel electrolyte may include a polymer and a polymer ionic liquid. For example, the polymer may be a solid graft (block) copolymer electrolyte.

In some embodiments, the electrolyte may further include a solid electrolyte. For example, the solid electrolyte may be an organic solid electrolyte or an inorganic solid electrolyte.

Non-limiting examples of the organic solid electrolyte are polyethylene derivatives, polyethylene oxide derivatives, polypropylene oxide derivatives, phosphoric acid ester polymer, polyester sulfide, polyvinyl alcohol, polyvinylidene fluoride, and polymers including ionic dissociative groups.

Non-limiting examples of the inorganic solid electrolyte are $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, $Cu_3N$, LiPON, $Li_2S.GeS_2.Ga_2S_3$, $Li_2O.11Al_2O_3$, $(Na,Li)_{1+x}Ti_{2-x}Al_x(PO_4)_3$ (where $0.1 \leq x \leq 0.9$), $Li_{1+x}Hf_{2-x}Al_x(PO_4)_3$ (where $0.1 \leq x \leq 0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, Na-Silicates, $Li_{0.3}La_{0.5}TiO_3$, $Na_5MSi_4O_{12}$ (where M is a rare earth element, such as Nd, Gd, Dy, or the like) $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x(Ge_{1-y}Ti_y)_{2-x}(PO_4)_3$ (where $0 \leq X \leq 0.8$, $0 \leq Y \leq 1.0$, and M is Nd, Sm, Eu, Gd, Tb, Dy, Ho, Er, Tm, or Yb), $Li_{1+x+y}Q_xTi_{2-x}Si_yP_{3-y}O_{12}$ (where $0 < x \leq 0.4$, $0 < y \leq 0.6$, and Q is Al or Ga), $Li_6BaLa_2Ta_2O_{12}$, $Li_7La_3Zr_2O_{12}$, $Li_5La_3Nb_2O_{12}$, $Li_5La_3M_2O_{12}$ (where M is Nb or Ta), $Li_{7+x}A_xLa_{3-x}Zr_2O_{12}$ (where $0 < x < 3$, and A is Zn).

The inorganic particle for the electrolyte may be any inorganic particles available in the art. For example, the electrolyte may further include inorganic particles of at least one selected from $SiO_2$, $TiO_2$, ZnO, $Al_2O_3$, $BaTiO_3$, and a cage-structured silsesquioxane. For example, the cage-structured silsesquioxane may be a polyhedral oligomeric silsesquioxane (POSS). When the electrolyte further includes an inorganic particle as described above, the electrolyte may have further improved mechanical properties. The inorganic particle may have an average particle diameter of 100 nm or less, and in some embodiments, about 1 nm to about 100 nm, and in some other embodiments, about 5 nm to about 100 nm, and in still other embodiments, about 10 nm to about 100 nm, and in yet other embodiments, about 10 nm to about 70 nm, and in yet still other embodiments, about 30 nm to about 70 nm. When the average particle diameter of the inorganic particles is within these ranges, it may be possible to prepare an electrolyte having improved film formability and improved mechanical properties without deterioration in ionic conductivity.

The separator for the electrolyte may be a monolayer or a multilayer including at least two layers of polyethylene, polypropylene, polyvinylidene fluoride, or a combination thereof. The multilayer may be a mixed multilayer. For example, the separator may be a two-layered separator of polyethylene/polypropylene, a three-layered separator of polyethylene/polypropylene/polyethylene, a three-layered separator of polypropylene/polyethylene/polypropylene, or the like.

In some embodiments, the electrolyte may be in solid or gel form. The electrolyte may be formed as a membrane, film, or sheet having a thickness of about 200 μm or less, and in some embodiments, about 10 μm to about 200 μm, and in some embodiments, about 10 μm to about 100 μm, and in some other embodiments, about 10 μm to about 60 μm. An electrolyte in the form of sheet, film, or membrane may be formed using a known technology, such as spin coating, roll coating, curtain coating, extruding, casting, screen printing, or inkjet printing.

In some embodiments, the electrolyte may have an ionic conductivity (at 25° C.) of about $1 \times 10^{-5}$ S/cm or greater, for example, about $1 \times 10^{-5}$ to about $1 \times 10^{-4}$ S/cm at 25° C. The electrolyte may have a tensile modulus (at 25° C.) of about 8.0 MPa or greater. The electrolyte may have a tensile strength (at 25° C.) of about 0.01 MPa or greater, for example, about 0.1 MPa to about 10 MPa. Accordingly, an electrolyte according to any of the above-described embodiments may have good ionic conductivity and good mechanical properties at room temperature that are desired for the performance of a battery.

In some embodiments, the electrolyte has a lithium ion transference number of about 0.2 or greater at about 25° C. Also, the electrolyte has a reduction current of about 5 mA or less at a voltage of around −0.35V with respect to lithium metal.

Hereinafter, a method of manufacturing an electrolyte, according to an embodiment, will be described.

First, a composite that includes a metal-organic framework and an ionic liquid impregnated into the metal-organic framework, an ion-conductive polymer, and a solvent may be mixed together to obtain an electrolyte composition.

The solvent may be tetrahydrofuran, methylethyl ketone, acetonitrile, ethanol, N, N-dimethylformamide, acetonitrile, methylene chloride, or a mixture thereof. The amount of the solvent may be in a range of about 100 parts to about 3,000 parts by weight, based on 100 parts by weight of the ion-conductive polymer.

The electrolyte composition may then be coated on a base and dried to form an electrolyte membrane, following by separating the electrolyte membrane from the base, thereby manufacturing an electrolyte. The drying may be performed, for example, at about 30° C. to about 80° C.

The coating may be performed using any method available to form electrolytes in the art, for example, using spin coating, roll coating, curtain coating, extruding, casting, screen printing, or inkjet printing At least one selected from an alkali metal salt and an alkaline earth metal salt, an organic solvent, inorganic particles, or a mixture thereof may be further added to the electrolyte composition.

According to another embodiment of the present disclosure, a secondary battery includes a cathode, an anode, and any of the electrolytes according to the above-described embodiments disposed between the cathode and the anode.

In some embodiments, the electrolyte may be coated on at least part of the anode.

The secondary battery may be, for example, a lithium secondary battery, a lithium air battery, a lithium sulfur battery, a lithium sodium battery, or a lithium magnesium battery, or the like.

A lithium magnesium battery is a battery using relatively cheap and abundant magnesium metal, instead of rare lithium, as an anode. The lithium/magnesium battery is charged or discharged with intercalation and deintercalation of magnesium ions into/from a cathode active material, and has about 2 times higher theoretical energy density than lithium batteries, and is cheap and stable in the air. In addition, due to environmental friendliness, strong price competitiveness, and high energy storage characteristics, the lithium/magnesium battery may be applicable as a medium and large size battery for power storage and electric vehicles, thus drawing attention as a next-generation secondary battery. A lithium sodium battery includes a cathode that allows doping and undoping of sodium ions, and an anode that allows doping and undoping of sodium ions.

A lithium secondary battery has high operation voltage, high capacity, and high energy density, and thus is currently in wide use in mobile phones, laptop computers, storage batteries for power generating units using wind power or sunlight, electric vehicles, uninterruptable power supplies (UPS), household storage batteries, and the like.

In some embodiments, the secondary battery may further include at least one selected from a liquid electrolyte, a polymer ionic liquid, a solid electrolyte, and a gel electrolyte). At least one of a liquid electrolyte, a polymer ionic liquid, a gel electrolyte, and a solid electrolyte may be disposed between the cathode and the electrolyte.

FIGS. 1A to 1E are schematic views illustrating structures of lithium secondary batteries each including an electrolyte according to an embodiment.

Referring to FIG. 1A, a lithium secondary battery according to an embodiment may have a structure including an electrolyte 23 between a cathode 21 and an anode 22, the electrolyte 23 including any of the composites according to the above-described embodiments and an ionic-conductive polymer.

Figure 1B:
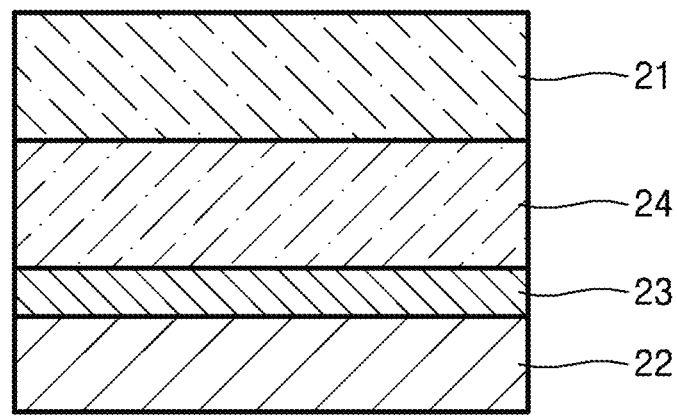

Referring to FIG. 1B, the lithium secondary battery may further includes an intermediate layer 24 between the electrolyte 23 and the cathode 21. The intermediate layer 24 may further include at least one selected from a liquid electrolyte, a polymer ionic liquid, a solid electrolyte, and a gel electrolyte, each having a different composition from the electrolyte 23.

Since the electrolyte 23 is disposed on at least part of a surface of the anode 22, the surface of the anode 22 may become mechanically and electrochemically stable. Accordingly, dendritic growth on the surface of the anode 22 due to ununiform ion distribution during charging and discharging of the lithium second battery may be suppressed, and interfacial stability between the anode 22 and the electrolyte 23 may be improved, thus improving cycle characteristics of the lithium second battery.

Figure 1C:
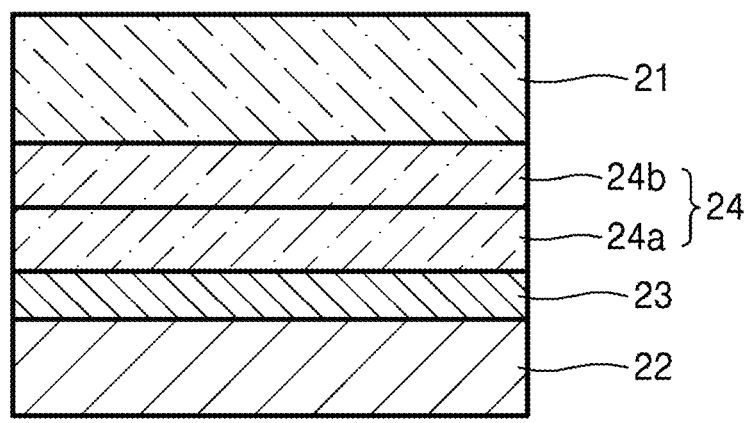

The electrolyte 23 may serve as a protective layer for the surface of the anode 22 when it coats the surface of the anode 22. The intermediate layer 24 may have a bi-layer structure including a liquid electrolyte 24a and a solid electrolyte 24b that are sequentially disposed upon one another, as illustrated in FIG. 1C. The liquid electrolyte 24a may be disposed adjacent to the electrolyte 23. A lithium secondary battery may have a stack structure of anode/electrolyte/intermediate layer (liquid electrolyte/solid electrolyte)/cathode as in FIG. 1C.

Figure 1D:
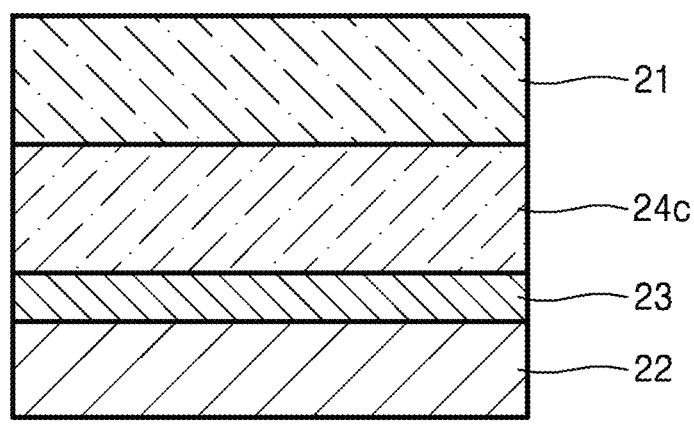

Referring to FIG. 1D, a lithium second battery according to another embodiment may include a separator 24c as an intermediate layer. The separator 24c may be a monolayer or a multilayer including at least two layers of polyethylene, polypropylene, polyvinylidene fluoride, or a combination thereof. For example, the separator 24c may be a mixed multilayer, such as a 2-layer separator of polyethylene/polypropylene, a 3-layer separator of polyethylene/polypropylene/polyethylene, or a 3-layer separator of polypropylene/polyethylene/polypropylene.

Figure 1E:
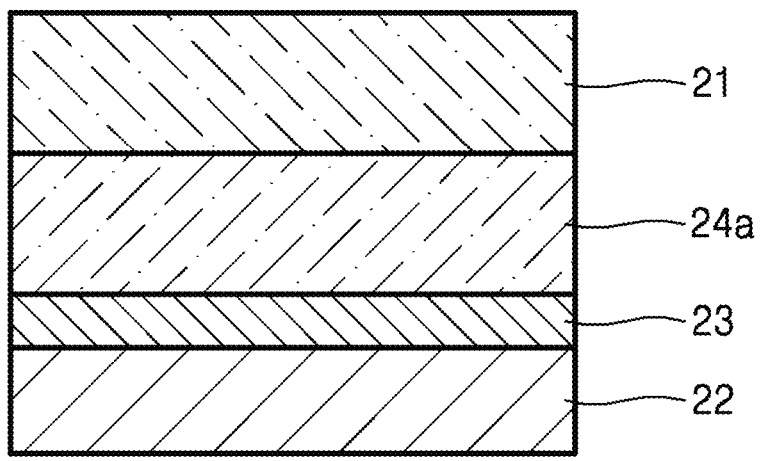

A lithium secondary battery according to an embodiment may include a liquid electrolyte 24a as an intermediate layer, as illustrated in FIGS. 1C and 1E. The liquid electrolyte 24a may have the same or different composition from a liquid electrolyte that the electrolyte 23 may include.

In FIGS. 1A to 1E, the cathode 21 may be a porous cathode. The porous cathode may be a cathode including pores, or any cathode that allows permeation of liquid electrolyte thereinto by capillary action.

For example, the porous cathode may be a cathode obtained by coating a cathode active material composition including a cathode active material, a conducting agent, a binder, and a solvent, followed by drying. The resulting cathode may include pores among particles of the cathode active material. The porous cathode may be impregnated with liquid electrolyte.

In some embodiments, the cathode 21 may include a liquid electrolyte, a gel electrolyte, a solid electrolyte, or the like. The liquid electrolyte, the gel electrolyte, and the solid electrolyte may be any electrolyte available for liquid batteries in the art that does not react with the cathode active material to deteriorate the same during charging and discharging.

In FIGS. 1A to 1E, the anode 22 may be a lithium metal thin film. The lithium metal thin film may have a thickness of less than about 100 μm. When the thickness of the lithium metal thin film is less than about 100 μm, the lithium battery may have stable cycle characteristics. For example, the lithium metal thin film of the lithium battery may have a thickness of about 80 μm or less, and in some embodiments, about 60 μm or less, and in some other embodiments, about 0.1 μm to about 60 μm. According to the prior art, when such a lithium metal thin film has a thickness of less than 100 μm, it is difficult to implement a lithium battery with stable cycle characteristics since the thickness of the lithium metal thin film may be seriously reduced due to a side reaction, dendritic formation, or the like. However, a lithium secondary battery with stable cycle characteristics may be manufactured using any of the electrolytes according to the above-described embodiments.

Figure 1F:
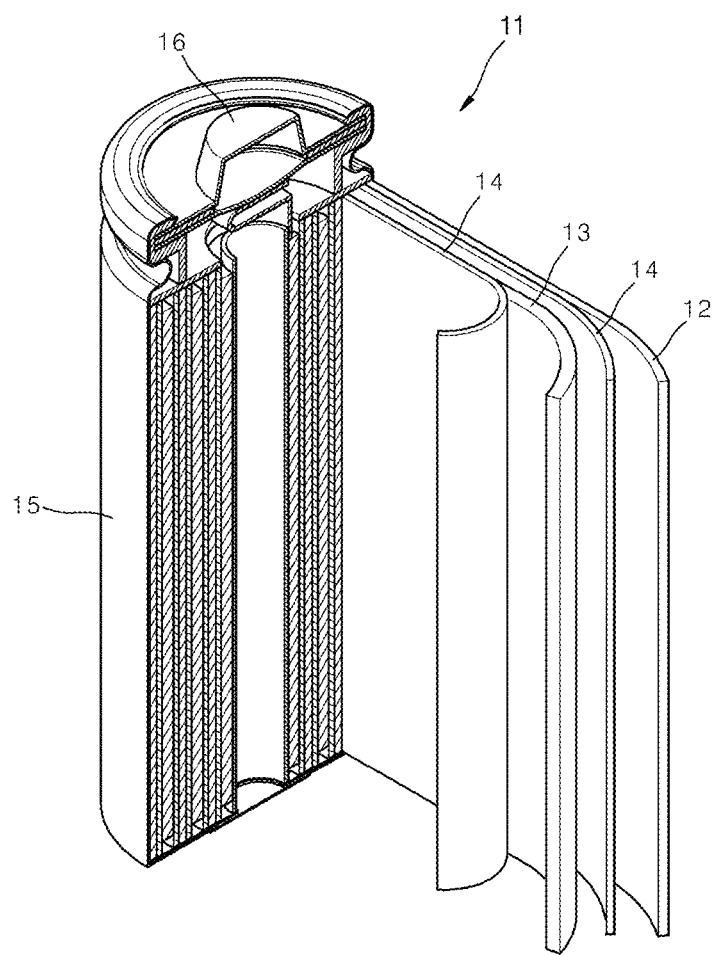
FIG. 1F is a perspective view of a structure of an embodiment of a lithium secondary battery including an embodiment of an electrolyte.

FIG. 1F is an exploded perspective view of a structure of a lithium secondary battery 11 according to an embodiment.

Referring to FIG. 1F, the lithium secondary battery 11 may include a cathode 13, an anode 12, and an electrolyte 14 acceding to an embodiment. The cathode 13, the anode 12, and the electrolyte 14 may be rolled or folded and then be accommodated in a battery case 15, followed by injecting an liquid electrolyte into the battery case 15 and sealing with a cap assembly 16, thereby completing manufacture of the lithium secondary battery 11. The battery case 15 may be a cylindrical, rectangular, or thin-film type. For example, the lithium secondary battery 11 may be a large thin-film battery. The lithium secondary battery 11 may be, for example, a lithium ion secondary battery.

A separator (not shown) may be further disposed between the cathode 13 and anode 12 to form an electrode assembly. The electrode assembly may be staked on another electrode assembly to form a bicell structure, which may then be impregnated with an electrolyte solution. The resultant may be accommodated in a pouch and then sealed to complete manufacture of a lithium polymer secondary battery.

In some embodiments, a plurality of such electrode assemblies may be stacked upon one another to form a battery pack. The battery pack may be applicable in any device that needs to have high capacity, for example, a laptop computer, a smart phone, an electric vehicle, or the like.

According to another aspect of the present disclosure, a lithium secondary battery may include a cathode, a lithium metal or lithium metal alloy as an anode, and any of the electrolytes according to the above-described embodiments. For example, the lithium secondary battery may be a lithium metal battery.

The electrolyte may serve as a protective layer for the lithium metal or lithium metal alloy electrode. When the electrolyte is disposed on a surface of the anode, dendritic growth on the surface of the anode after charging and discharging, and a short circuit that may occur due to cracking of the electrolyte may both be effectively suppressed.

In some embodiments, the lithium secondary battery may have an operation voltage of about 4.0V to about 5.0V, for example, about 4.5V to about 5.0V.

In some embodiments, the lithium secondary battery may further include an additional layer of at least one selected from a liquid electrolyte, a polymer ionic liquid, a solid electrolyte, a gel electrolyte, and a separator, between the cathode and the electrolyte.

In some embodiments, the lithium secondary battery may further include a liquid electrolyte adjacent to the cathode. The cathode may be a porous cathode impregnated with the liquid electrolyte.

Each of the components of the lithium battery including any of the electrolytes according to the above-described embodiments, and a method of manufacturing a lithium battery including such components as described above will be described in greater detail.

A cathode active material for the cathode may include at least one selected from lithium cobalt oxide, lithium nickel cobalt manganese oxide, lithium nickel cobalt aluminum oxide, lithium iron phosphate, and lithium manganese oxide, but is not limited thereto. Any cathode active material available in the art may be used.

For example, the cathode active material may be a compound represented by one of the following formulae: $Li_aA_{1-b}B'_bD_2$ (where $0.90 \leq a \leq 1.8$, and $0 \leq b \leq 0.5$); $Li_aE_{1-b}B'_bO_{2-c}D_c$ (where $0.90 \leq a \leq 1.8$, $0 \leq b \leq 0.5$, and $0 \leq c \leq 0.05$); $LiE_{2-b}B'_bO_{4-c}D_c$ (where $0 \leq b \leq 0.5$, and $0 \leq c \leq 0.05$); $Li_aNi_{1-b-c}Co_bB'_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$, and $0.001 \leq b \leq 0.1$); $Li_aCoG_bO_2$ (where $0.90 \leq a \leq 1.8$, and $0.001 \leq b \leq 0.1$); $Li_aMnG_bO_2$ (where $0.90 \leq a \leq 1.8$, and $0.001 \leq b \leq 0.1$); $LiaMn_2G_bO_4$ (where $0.90 \leq a \leq 1.8$, and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulae above, A is selected from nickel (Ni), cobalt (Co), manganese (Mn), and combinations thereof; B' is selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from oxygen (O), fluorine (F), sulfur (S), phosphorus (P), and combinations thereof; E is selected from cobalt (Co), manganese (Mn), and combinations thereof; F' is selected from fluorine (F), sulfur (S), phosphorus (P), and combinations thereof; G is selected from aluminum (Al), chromium (Cr), manganese (Mn), iron (Fe), magnesium (Mg), lanthanum (La), cerium (Ce), strontium (Sr), vanadium (V), and combinations thereof; Q is selected from titanium (Ti), molybdenum (Mo), manganese (Mn), and combinations thereof; I is selected from chromium (Cr), vanadium (V), iron (Fe), scandium (Sc), yttrium (Y), and combinations thereof; and J is selected from vanadium (V), chromium (Cr), manganese (Mn), cobalt (Co), nickel (Ni), copper (Cu), and combinations thereof.)

For example, the cathode active material may be a compound represented by Formula 7, a compound represented by Formula 8, or a compound represented by Formula 9.

$$Li_aNi_bCo_cMn_dO_2 \quad \text{Formula 7}$$

In Formula 7, $0.90 \leq a \leq 1.8$, $0 \leq b \leq 0.9$, $0 \leq c \leq 0.5$, and $0 \leq d \leq 0.5$.

$$Li_2MnO_3 \quad \text{Formula 8}$$

$$LiMO_2 \quad \text{Formula 9}$$

In Formula 9, M may be Mn, Fe, Co, or Ni.

A cathode may be manufactured as follows.

A cathode active material, a binder, and a solvent are mixed to prepare a cathode active material composition. A conducting agent may be further added into the cathode active material composition. The cathode active material composition is directly coated on a metallic current collector and dried to prepare a cathode plate. Alternatively, the cathode active material composition may be cast on a separate support to form a cathode active material film, which may then be separated from the support and then laminated on a metallic current collector to prepare a cathode plate.

The binder is a composition that contributes binding with an active material and a conductive material and binding with a current collector, and thus an amount of the binder added is from about 1 part to about 50 parts by weight based on 100 parts by weight based on the total weight of the positive electrode active material. Examples of the binder include polyvinylidene fluoride (PVDF), polyvinyl alcohol, carboxymethylcellulose (CMC), starch, hydroxypropylcellulose, reproduced cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, and various copolymers. A content of the binder is from about 2 parts to about 5 parts by weight based on 100 parts by weight of the total weight of the positive electrode active material. When a content of the binder is within this range, a binding force of the active material layer with respect to the current collector is satisfactory.

The conductive agent may be any material that does not cause chemical change in the battery and have conductivity, and examples of the conductive agent include graphite such as natural graphite or artificial graphite; carbon blacks, such as carbon black, acetylene black, Ketjen black, channel black, furnace black, lamp black, or summer black; conductive fibers, such as carbon fibers or metal fibers; carbon fluoride; metal powder, such as aluminum or nickel powder; conductive whisky, such as zinc oxide or potassium titanate; a conductive metal oxide, such as a titanium oxide; and a conductive material, such as a polyphenylene derivative.

A content of the conducting agent may be from about 1 parts to about 10 parts by weight for example, from about 1 parts to about 5 parts by weight based on 100 parts by weight of the total weight of the positive electrode active material. When a content of the conducting agent is within this range, the finally obtained electrode may have excellent conductivity characteristic.

Examples of the solvent include N-methylpyrrolidone.

A content of the solvent is from about 100 parts to about 2000 parts by weight based on 100 parts by weight of the positive electrode active material. When a content of the solvent is within this range, a process for forming the active material layer may be easily carried out.

In some embodiments, a plasticizer may be further added to the composition for forming the positive electrode active material and/or the composition for forming the negative electrode active material, so as to form pores in an electrode plate.

The amounts of the positive electrode active material, the conducting agent, the binder, and the solvent may be those levels that are generally used in lithium secondary batteries in the art. In some embodiments, at least one of the conducting agent, the binder, and the solvent may not be used according to the use and structure of the lithium secondary battery.

If desired, a plasticizer may be further added into the cathode active material composition to form electrode plates including pores. The amounts of the cathode active material, the conducting agent, the binder, and the solvent may be those levels that are generally used in lithium secondary batteries in the art. At least one of the conducting agent and the solvent may not be used depending on the use and the structure of the lithium secondary battery.

An anode may be manufactured in a substantially same manner as in the manufacture of the cathode, except for using an anode active material instead of the cathode active material.

The anode active material may be a carbonaceous material, silicon, a silicon oxide, a silicon-based alloy, a silicon-carbonaceous material composite, tin, a tin-based alloy, a tin-carbon composite, a metal oxide, or a combination thereof. The carbonaceous material may be crystalline carbon, amorphous carbon, or a mixture thereof. The crystalline carbon may be graphite, such as natural graphite or artificial graphite that are in non-shaped, plate, flake, spherical or fibrous form. The amorphous carbon may be soft carbon (carbon sintered at low temperatures), hard carbon, mesophase pitch carbonization products, sintered corks, graphene, carbon black, fullerene soot, carbon nanotubes, and carbon fibers. Any appropriate material available in the art may be used.

The anode active material may be selected from Si, SiOx (where $0<x<2$, for example, $0.5<x<1.5$), Sn, $SnO_2$, a silicon-containing metal alloy, and a mixture thereof. A metal that is alloyable with silicon may be at least one selected from Al, Sn, Ag, Fe, Bi, Mg, Zn, In, Ge, Pb, and Ti.

The anode active material may include a metal/metalloid alloyable with lithium, an alloy thereof, or an oxide thereof. Examples of the metal/metalloid alloyable with lithium, an alloy thereof, or an oxide thereof are Si, Sn, Al, Ge, Pb, Bi, Sb, Si—Y' alloy (where Y' is an alkali metal, an alkaline earth metal, a Group 13 to 16 element, a transition metal, a rare earth element, or a combination thereof except for Si), a Sn—Y'' alloy (where Y'' is an alkali metal, an alkaline earth metal, a Group 13 to 16 element, a transition metal, a rare earth element, or a combination thereof except for Sn), and $MnO_x$ (where $0<x\leq2$). Y' and Y'' may each independently be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or combinations thereof. Non-limiting examples of the oxide of the metal/metalloid alloyable with lithium are a lithium titanium oxide, a vanadium oxide, and a lithium vanadium oxide, $SnO_2$, and $SiO_x$ (where $0<x<2$).

For example, the anode may be a lithium metal thin film.

The amounts of the anode active material, the conducting agent, the binder, and the solvent may be those levels that are generally used in the manufacture of lithium batteries in the art.

The electrolyte may be any of the electrolytes according to the above-described embodiments.

For example, the lithium battery may further include a separator and/or a lithium salt-containing nonaqueous electrolyte that are in common use in lithium batteries in the art, in addition to the electrolyte according to any of the above-described embodiments).

The separator may be an insulating thin film having high ion permeability and high mechanical strength. The separator may have a pore diameter of about 0.01 μm to about 10 μm, and a thickness of about 5 μm to about 20 μm. Examples of the separator are olefin-based polymers, such as polypropylene, and sheets or non-woven fabric made of glass fiber or polyethylene. When the electrolyte of the lithium battery is a solid polymer electrolyte, the solid polymer electrolyte may also serve as a separator.

The separator may be a monolayer or a multilayer including at least two layers of polyethylene, polypropylene, polyvinylidene fluoride, or a combination thereof. The multilayer may be a mixed multilayer. For example, the separator may be a two-layered separator including polyethylene and polypropylene layers, a three-layered separator including polyethylene, polypropylene and polyethylene layers, or a three-layered separator including polypropylene, polyethylene and polypropylene layers.

The lithium salt-containing nonaqueous electrolyte may include a nonaqueous electrolyte and a lithium salt.

The nonaqueous electrolyte may be a nonaqueous liquid electrolyte, an organic solid electrolyte, or an inorganic solid electrolyte.

The nonaqueous liquid electrolyte may include an organic solvent. The organic solvent may be any organic solvent available in the art. For example, the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, chloroethylene carbonate, benzonitrile, acetonitrile, tetrahydrofuran, 2-methyltetrahydrofuran, γ-butyrolactone, dioxorane, 4-methyldioxorane, N,N-dimethyl formamide, N,N-dimethyl acetamide, dimethylsulfoxide, dioxane, 1,2-dimethoxyethane, sulfolane, dichloroethane, chlorobenzene, nitrobenzene, diethylene glycol, dimethyl ether, or a mixture thereof.

For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO2)(C_yF_{2y+1}SO_2)$ (where x and y are natural numbers), LiCl, LiI, or a mixture thereof.

In some embodiments, the lithium battery may have improved lifetime characteristics, and thus may be used in a battery cell for use as a power source of a small device, and may also be used as a unit battery of a medium-large size battery pack or battery module that include a plurality of battery cells for use as a power source of a medium-large size device.

Examples of the medium-large size device are electric vehicles (EVs), including hybrid electric vehicles (HEVs) and plug-in hybrid electric vehicles (PHEVs); electric two-wheeled vehicles, including E-bikes and E-scooters; power tools; power storage devices; and the like, but are not limited thereto.

In some embodiments, the electrolyte may be used in a storage device, for example, a supercapacitor.

Supercapacitors may be classified into the following three types depending on an electrode material and a mechanism thereof: an electric double layer capacitor (EDLC) that uses active carbon as an electrode and an EDLC mechanism; a metal oxide electrode pseudocapacitor (or redox capacitor) that uses a transition metal oxide and a conductive polymer as electrodes and a psedocapacitor mechanism; and a hybrid capacitor having both characteristics of the EDLC and an electrolytic capacitor.

In some embodiments, the electrolyte may be applicable in any type of supercapacitor.

Figure 1G:
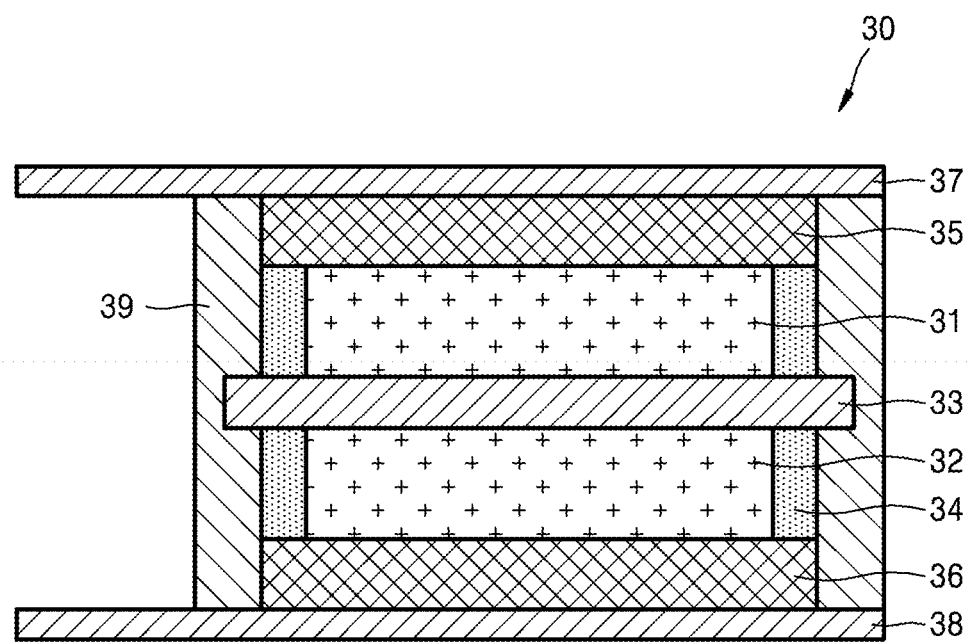
FIG. 1G is a side cross-sectional view of an embodiment of a hybrid supercapacitor including an embodiment of an electrolyte.

FIG. 1G is a side cross-sectional view of a hybrid supercapacitor 30 including an electrolyte according to an embodiment described above.

Referring to FIG. 1G, the hybrid supercapacitor 30 has a basic cell structure including a cathode 31, an anode 32, an electrolyte 33 that separates the cathode 31 and the anode 32 from each other, and a liquid electrolyte 34 that contacts the cathode 31 and the anode 32.

The cathode 31 may include a transition metal oxide, and the anode 32 may include a carbide doped with lithium ions. In the present embodiment, a material for the cathode 31 may be a material similar to a cathode material of a redox pseudocapacitor, and a material for the anode 32 may be a material similar to an anode material of a hybrid capacitor.

The transition metal oxide for the cathode 31 may be represented by $MO_x$, where M is at least one transition metal selected from Sc, Ti, V, Cr, Mn, Fe, Co, Ni, Cu, Zn, and Ru. For example, the transition metal oxide for the cathode 31 may be $MnO_x$, $NiO_x$, $RuO_x$, $CoO_x$, or ZnO. The cathode 31 may include a transition metal oxide alone or a mixture of a transition metal oxide with other active material. The other active material may be carbon, a conductive polymer, or a mixture thereof. For example, the anode 32 may include graphite doped with lithium ions.

The liquid electrolyte 34 may be any known electrolyte solution that may conduct current flow between the cathode 31 and the anode 32, for example, an aqueous electrolyte solution, a nonaqueous electrolyte solution, or an ionic liquid.

The hybrid supercapacitor 30 of FIG. 1G may include a housing 39 for accommodating the cathode 31, the anode 32, the separator and the electrolyte 33; current collectors 35 and 36 connected to the cathode 31 and the anode 32, respectively; and terminals 37 and 38 connected to the cathode 31 and the anode 32, respectively.

As used herein, the term "alkyl" refers to a completely saturated branched or unbranched (or straight-chained or linear) hydrocarbon group. Non-limiting examples of the "alkyl" group are methyl, ethyl, n-propyl, isopropyl, n-butyl, isobutyl, sec-butyl, n-pentyl, isopentyl, neopentyl, n-hexyl, 3-methylhexyl, 2,2-dimethylpentyl, 2,3-dimethylpentyl, and n-heptyl.

At least one hydrogen atom of the alkyl group may be substituted with a halogen atom, a C1-C30 alkyl group substituted with a halogen atom (for example, $CF_3$, $CHF_2$, $CH_2F$, $CCl_3$, and the like), a C1-C30 alkoxy group, a C2-C30 alkoxyalkyl group, a hydroxyl group, a nitro group, a cyano group, an amidino group, a hydrazine group, a hydrazone group, a carboxyl group or a salt thereof, a sulfonyl group, a sulfamoyl group, a sulfonic acid group or a salt thereof, a phosphoric acid group or a salt thereof, a C1-C30 alkyl group, a C2-C30 alkenyl group, a C2-C30 alkynyl group, a C1-C30 heteroalkyl group, a C6-C30 aryl group, a C7-C30 arylalkyl group, a C3-C30 heteroaryl group, a C4-C30 heteroarylalkyl group, a C3-C30 heteroaryloxyl group, a C3-C30 heteroaryloxyalkyl group, or a C4-C30 heteroarylalkyl group.

The term "halogen atom" indicates fluorine, bromine, chloride, iodine, and the like.

As used herein, the term "alkenyl" group indicates a branched or unbranched hydrocarbon group with at least one carbon-carbon double bond. Non-limiting examples of the alkenyl group are vinyl, aryl, butenyl, isopropenyl, and isobutenyl. One or more hydrogen atoms in the alkenyl group may be substituted with any of the substituents for the alkyl group as described above.

As used herein, the term "alkynyl" indicates a branched or unbranched hydrocarbon group with at least one carbon-carbon triple bond. Non-limiting examples of the "alkynyl" group are ethynyl, butynyl, isobutynyl, and isopropynyl. One or more hydrogen atoms of the "alkynyl" group may be substituted with any of the substituents for the alkyl group as described above.

The term "aryl" is construed as including an aromatic ring wherein the aromatic ring may be fused to another aromatic ring or one or more carbocyclic groups. Non-limiting examples of the "aryl" group are phenyl, naphthyl, and tetrahydronaphthyl. One or more hydrogen atoms of the "aryl" group may be substituted with any of the substituents for the alkyl group as described above.

As used herein, the term "heteroaryl group" indicates a monocyclic or bicyclic aromatic group including at least one heteroatom selected from among nitrogen (N), oxygen (O), phosphorous (P), and sulfur (S), wherein the rest of the cyclic atoms are carbon. The heteroaryl group may include, for example, one to five heteroatoms, and in some embodiments, may include a five- to ten-membered ring. In the heteroaryl group, S or N may be present in various oxidized forms. Non-limiting examples of the monocyclic heteroaryl group are thienyl, furyl, pyrrolyl, imidazolyl, pyrazolyl, thiazolyl, isothiazolyl, 1,2,3-oxadiazolyl, 1,2,4-oxadiazolyl, 1,3,4-oxadiazolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, or 5-pyrimidin-2-yl.)

The term "polycyclic heteroaryl" indicates a heteroaromatic ring fused to at least one of an aryl group, a cycloaliphatic group, and a heterocyclic group.

As used herein, the term "carbocyclic" group indicates a saturated or partially unsaturated non-aromatic monocyclic, bicyclic or tricyclic hydrocarbon group. Non-limiting examples of the monocyclic hydrocarbon group are cyclopentyl, cyclopentenyl, cyclohexyl, and cyclohexenyl. Non-limiting examples of the bicyclic hydrocarbon group are decahydronaphthyl and bicyclo[2.1.1]hexyl. A non-limiting example of the tricyclic hydrocarbon group is adamantyl.

As used herein, the term "haloalkyl" indicates an alkyl group including at least one halogen atom, and the term "heteroalkyl" indicates an alkyl group including at least one hetero atom selected from S, O, N, and B.

As used herein, the term "heterocyclic" group indicates a C5-20 carbocyclic group, for example, C5-10 carbocyclic, including at least one hetero atom in the ring. For example, the at least one hetero atom is selected from S, N, O, and B.

As used herein, the terms "alkoxy", "aryloxy", and "heteroaryloxy" indicate alkyl, aryl, and heteroaryl, respectively, each bound to oxygen atom. The terms "alkylthio", "arylthio", "heteroarylthio", and "heteroalkylthio" indicate alkyl, aryl, heteroaryl, and heteroalkyl, respectively, each bound to sulfur.

Hereinafter, one or more embodiments of the present disclosure will be described in detail with reference to the following examples. However, these examples are not intended to limit the scope of the one or more embodiments of the present disclosure.

EXAMPLES

Preparation Example 1: Preparation of Metal-Organic Framework ($Ti_8O_8(OH)_4\{O_2C-C_6H_4-CO_2\}_6$)

Titanium isopropoxide and 1,4-benzene dicarboxylic acid were mixed in a mixed solvent (9:1 by volume) of methanol and N, N-dimethylformamide to obtain a mixture. The amounts of titanium isopropoxide and 1,4-benzene dicarboxylic acid in the mixture were stoichiometrically controlled to obtain $Ti_8O_8(OH)_4\{O_2C-C_6H_4-CO_2\}_6$ as a target product. A total amount of the mixed solvent was adjusted to be about 150 times of the amount of titanium isopropoxide by weight.

The mixture was then thermally treated at about 150° C. for about 24 hours.

After completion of the reaction, the resulting reaction product was cooled down to room temperature (about 20° C. to about 25° C.). The cooled reaction product was washed with methanol and then with N, N-dimethylformamide, and then dried at about 120° C. for about 24 hours to obtain $Ti_8O_8(OH)_4\{O_2C-C_6H_4-CO_2\}_6$) (hereinafter, referred to as "TiMOF") as a metal-organic framework.

Preparation Example 2: Preparation of Composite 0.2 g of TiMOF (MIL-125) of Preparation Example 1, and 0.002 g N-methyl-N-propylpyrrolidinium bis(trifluoromethanesulfonyl)imide (PYR13TFSI) as an ionic liquid were mixed together to obtain a composite composition. This composite composition was left in a vacuum condition at about 70° C. for about 3 hours to impregnate $Ti_8O_8(OH)_4\{O_2C-C_6H_4-CO_2\}_6$ with the ionic liquid, (i.e. to dispose the ionic liquid within a pore defined by the metal-organic framework) (i.e. to dispose the ionic liquid within a pore defined by the metal-organic framework).

The resulting product was washed with acetone and dried at about 120° C. to obtain a composite (hereinafter, referred to as (TiMOF+IL)) including TiMOF and the ionic liquid impregnated thereinto. The amount of the ionic liquid in the composite was about 1 part by weight based on 100 parts by weight of a total weight of the composite (including the ionic liquid and TiMOF).

Preparation Example 3: Preparation of Composite

A composite was prepared in the same manner as in Preparation Example 2, except that $Al(OH)\{O_2C-C_6H_4-CO_2\}$ (hereinafter, referred to as AlMOF) prepared as follows, instead of TiMOF, was used.

AlMOF was prepared as follows. Aluminum nitrate and 1,4-benzene dicarboxylic acid were mixed in a mixed solvent (9:1 by volume) of methanol and N, N-dimethylformamide to obtain a mixture. The amounts of aluminum nitrate and 1,4-benzene dicarboxylic acid in the mixture were stoichiometrically controlled to obtain $Al(OH)\{O_2C-C_6H_4-CO_2\}$ as a target product. A total amount of the mixed solvent was adjusted to be about 30 times of the amount of aluminum nitrate by weight.

The mixture was then thermally treated at about 150° C. for about 24 hours.

After completion of the reaction, the resulting reaction product was cooled down to room temperature (about 20° C. to about 25° C.). The cooled reaction product was washed with methanol and then with N, N-dimethylformamide, followed by drying at about 120° C. for about 24 hours to obtain a composite including $Al(OH)\{O_2C-C_6H_4-CO_2\}$ and the ionic liquid impregnated thereinto.

Preparation Example 4: Preparation of Composite

A composite was prepared in the same manner as in Preparation Example 2, except that the composition of the composite was changed by adjusting the amount of the ionic liquid in the composite to be about 0.1 parts by weight based on 100 parts by weight of a total weight of the composite (including the ionic liquid and TiMOF).

Preparation Example 5: Preparation of Composite

A composite was prepared in the same manner as in Preparation Example 2, except that the composition of the composite was changed by adjusting the amount of the ionic liquid in the composite to be about 50 parts by weight based on 100 parts by weight of a total weight of the composite (including the ionic liquid and TiMOF).

Comparative Preparation Example 1

0.2 g of MCM-48 (available from ACS material) was mixed with 0.002 g of N-methyl-N-propyl pyrrolidinium bis(trifluoromethanesulfonyl)imide (PYR13TFSI) as ionic liquid (IL) to obtain a composite composition. This composite composition was left under vacuum at about 70° C. for about 3 hours to allow MCM-48 to be impregnated with the ionic liquid.

The resulting product was washed with acetone and then dried at about 120° C. to obtain a composite (also referred to as (MCM-48+IL)) including MCM-48 and the ionic liquid impregnated into MCM-48. The amount of the ionic liquid in the composite was about 1 part by weight based on 100 parts by weight of a total weight of the composite (i.e., a total weight of the ionic liquid and MCM-48).

Example 1: Preparation of Electrolyte (PEO+(TiMOF-IL)+LiTFSI)

0.017 g of the composite of Preparation Example 2, 0.4 g of polyethylene oxide (PEO) (available from Aldrich, having a weight average molecular weight of about 600,000), lithium bistrifluoromethanesulfonimide (LiTFSI) as a lithium salt, and 10 mL of acetonitrile were mixed together to obtain an electrolyte composition. An amount of the lithium salt was adjusted so that a mole ratio (EO/Li) of ethylene oxide of the polyethylene oxide to lithium of the LiTFSI was about 16.

The electrolyte composition was coated on a support substrate by using a doctor blade, and then dried at about 60° C. for about 24 hours to prepare an electrolyte (having a thickness of about 40 μm).

The amount of the composite in the electrolyte of Example 1 was about 4.1 parts by weight based on 100 parts by weight of a total weight of the electrolyte (including the ion-conductive polymer (PEO) and the composite (TiMOF-IL)).

Example 2: Preparation of Electrolyte ((PS-b-PEO-b-PS)+(TiMOF-IL)+LiTFSI)

An electrolyte was prepared in the same manner as in Example 1, except that 0.4 g of a polystyrene-b-polyethylene oxide-b-polystyrene block copolymer (available from Polymer Source, Inc.), instead of 0.4 g of polyethylene oxide, was used, and the mole ratio of ethylene oxide of the polyethylene oxide to lithium of the lithium salt was changed to about 20. A weight ratio of the polystyrene block, the polyethylene oxide block, and the polystyrene block in the block copolymer was about 10:36:10, and the block copolymer had a weight average molecular weight of about 56,000 Daltons.

The amount of the composite in the electrolyte of Example 2 was about 4.1 parts by weight based on 100 parts by weight of a total weight of the electrolyte (including the ion conductive polymer (PS-b-PEO-b-PS) and the composite (TiMOF-IL)).

Example 3: Preparation of Electrolyte (PEO+(TiMOF-IL-LiTFSI)(LiTFSI-Impregnated TiMOF))

An electrolyte was prepared in the same manner as in Example 1, except that lithium bistrifluoromethanesulfonimide (LiTFSI) as a lithium salt was first impregnated into the composite of Preparation Example 2, and no LiTFSI was added in preparing the electrolyte composition.

Examples 4 and 5

Preparation of Electrolyte

An electrolyte was prepared in the same manner as in Example 1, except that the composite of Preparation Example 4 and the composite of Preparation Example 5 were used, respectively, instead of the composite of Preparation Example 2.

Example 6: Preparation of Electrolyte

An electrolyte was prepared in the same manner as in Example 1, except that the AlMOF composite of Preparation Example 3, instead of the composite of Preparation Example 2, was used.

Example 7: Preparation of Electrolyte

An electrolyte was prepared in the same manner as in Example 1, except that Cu(bpy)(H$_2$O)$_2$(BF$_4$)$_2$(bpy) (hereinafter, referred to as "CuMOF"), instead of TiMOF, was used.

Example 8: Preparation of Electrolyte

An electrolyte was prepared in the same manner as in Example 1, except that Zn$_4$O(O$_2$C—C$_6$H$_4$—CO$_2$)$_3$ (Zn-terephthalic acid-MOF, also referred to as "Zn-MOF"), instead of TiMOF, was used.

Example 9: Preparation of Electrolyte (PEO+TiMOF+IL+LiTFSI)

0.019 g of TiMOF of Preparation Example 1, 0.0019 g of N-methyl-N-propylpyrrolidinium bis(trifluoromethanesulfonyl)imide (PYR13TFSI) as an ionic liquid, polyethylene oxide (available from Aldrich, having a weight average molecular weight of about 600,000), lithium bistrifluoromethanesulfonimide (LiTFSI) as a lithium salt, and 10 mL of acetonitrile were mixed together to obtain an electrolyte composition. An amount of the lithium salt was adjusted so that a mole ratio (EO/Li) of ethylene oxide of the polyethylene oxide to lithium of the LiTFSI was about 16.

The electrolyte composition was cast on a glass substrate, and dried at about 60° C. for about 24 hours to prepare an electrolyte (having a thickness of about 40 μm).

The amount of the composite in the electrolyte of Example 9 was about 4.1 parts by weight based on 100 parts by weight of a total weight of the electrolyte (including the ion-conductive polymer (PEO) and the composite (TiMOF+IL)). The amount of the ionic liquid was about 9.09 parts by weight based on 100 parts by weight of a total weight of the composite (including TiMOF and IL).

Example 10: Preparation of Electrolyte (PEO+(TiMOF-IL)+LiTFSI)

An electrolyte was prepared in the same manner as in Example 1, except that the composition of the electrolyte composition was changed by adjusting the amount of the composite in the electrolyte to be about 0.1 parts by weight based on 100 parts by weight of a total weight of the electrolyte (including the ion-conductive polymer (PEO) and the composite (TiMOF-IL)).

Example 11: Preparation of Electrolyte (PEO+TiMOF-IL+LiTFSI)

An electrolyte was prepared in the same manner as in Example 1, except that the composition of the electrolyte composition was changed by adjusting the amount of the composite in the electrolyte to be about 60 parts by weight based on 100 parts by weight of a total weight of the electrolyte (including the ionic-conductive polymer (PEO) and the composite (TiMOF-IL)).

Comparative Example 1: Preparation of Electrolyte (PEO+LiTFSI)

0.4 g of polyethylene oxide (available from Aldrich, having a weight average molecular weight of about 600,000), lithium bistrifluoromethanesulfonimide (LiTFSI) as a lithium salt, and 10 mL of acetonitrile were mixed together to obtain an electrolyte composition. An amount of the lithium salt was adjusted so that a mole ratio (EO/Li) of ethylene oxide of the polyethylene oxide to lithium of the LiTFSI was about 16.

The electrolyte composition was cast on a glass substrate, and dried at about 60° C. for about 24 hours to prepare an electrolyte.

Comparative Example 2: Preparation of Electrolyte (PEO+TiMOF+LiTFSI)

0.019 g of TiMOF of Preparation Example 1, 0.4 g of polyethylene oxide (available from Aldrich, having a weight average molecular weight of about 600,000), lithium bistrifluoromethanesulfonimide (LiTFSI) as a lithium salt, and 10 mL of acetonitrile were mixed together to obtain an electrolyte composition.

An amount of the lithium salt was adjusted so that a mole ratio (EO/Li) of ethylene oxide of the polyethylene oxide to lithium of the LiTFSI was about 16.

The electrolyte composition was cast on a glass substrate, and dried at about 60° C. for about 24 hours to prepare an electrolyte.

Comparative Example 3: Preparation of Electrolyte (PEO+IL+LiTFSI)

0.4 g of polyethylene oxide (available from Aldrich, having a weight average molecular weight of about 600,000), 0.0019 g of N-methyl-N-propylpyrrolidinium bis(trifluoromethanesulfonyl)imide (PYR13TFSI) as an ionic liquid, lithium bistrifluoromethanesulfonimide (LiTFSI) as a lithium salt, and 10 mL of acetonitrile as a solvent were mixed together to obtain an electrolyte composition. An amount of the lithium salt was adjusted so that a mole ratio (EO/Li) of ethylene oxide of the polyethylene oxide to lithium of the LiTFSI was about 16.

The electrolyte composition was cast on a glass substrate, and dried at about 60° C. for about 24 hours to prepare an electrolyte.

Comparative Example 4: Preparation of Electrolyte (P(S-b-EO-b-S)+TiMOF+LiTFSI)

An electrolyte was prepared in the same manner as in Comparative Example 2, except that 0.4 g of a polystyrene-b-polyethylene oxide-b-polystyrene {P(S-b-EO-b-S)} block copolymer, instead of 0.4 g of polyethylene oxide (available from Aldrich, having a weight average molecular weight of about 600,000), was used. A weight ratio of the styrene unit, the ethylene oxide unit, and the styrene unit in the block copolymer was about 10:36:10, and the block copolymer had a weight average molecular weight of about 56,000 Daltons.

Comparative Example 5: Preparation of Electrolyte (PEO+LiTFSI+[MPS-IL])

0.4 g of polyethylene oxide (available from Aldrich, having a weight average molecular weight of about 600,000), 0.0019 g of the composite (MCM-48+IL) of Comparative Preparation Example 1, lithium bistrifluoromethanesulfonimide (LiTFSI) as a lithium salt, and 10 mL of acetonitrile as a solvent were mixed together to obtain an electrolyte composition. An amount of the lithium salt was adjusted so that a mole ratio (EO/Li) of ethylene oxide of the polyethylene oxide to lithium of the LiTFSI was about 16.

The electrolyte composition was cast on a glass substrate and dried at about 60° C. for about 24 hours to prepare an electrolyte.

Manufacture Example 1: Manufacture of Coin Cell

The electrolyte of Example 1 was disposed between a lithium electrode and stainless steel as a counter electrode to manufacture a coin cell.

Manufacture Examples 2 to 9: Manufacture of Coin Cells

Coin cells were manufactured in the same manner as in Manufacture Example 1, except that the electrolytes of Examples 2 to 9, instead of the electrolyte of Example 1, were used, respectively.

Manufacture Example 10: Manufacture of Lithium Secondary Battery (Full Cell)

0.1 g of the composite of Preparation Example 2, 0.2 g of ethoxylated trimethylolpropane triacrylate (ETPTA), 0.002 g of 2-hydroxy-2-methyl-1-phenyl propan-1-one (HMPP) as a photoinitiator, and 1 g of a liquid electrolyte (in which 1.3M LiPF6 was dissolved in a mixed solvent of ethylenecarbonate (EC):diethyl carbonate (DEC):fluoroethylene carbonate (FEC) in a volume ratio of about 2:6:2) were mixed together to obtain an electrolyte composition.

The electrolyte composition was coated on a lithium metal thin film (having a thickness of about 20 μm) by using a doctor blade, dried at about 25° C., and then irradiated with ultraviolet (UV) rays for about 30 minutes to form a lithium metal anode including the electrolyte (anode protective layer).

$LiCoO_2$, a conducting agent (Super-P, available from Timcal Ltd.), polyvinylidene fluoride (PVdF), and N-methylpyrrolidone were mixed together to obtain a cathode composition. A mixed weight ratio of $LiCoO_2$, the conducting agent, and PVDF in the cathode composition was about 97:1.5:1.5.

The cathode composition was coated on an aluminum foil (having a thickness of about 15 μm), dried at about 25° C., and then dried further at about 110° C. in a vacuum, thereby manufacturing a cathode.

The lithium metal anode including the electrolyte (anode protective layer) was disposed on the cathode, and a separator was disposed between the cathode and the electrolyte, thereby to manufacture a lithium secondary battery (having a structure of cathode/separator/electrolyte (anode protective layer)/anode). The separator used was a polypropylene separator (Cellgard 3510).

A liquid electrolyte was further added between the cathode and the electrolyte of the lithium secondary battery. The liquid electrolyte was obtained by dissolving 1.3M $LiPF_6$ as a lithium salt in a mixed solvent of ethylene carbonate, diethylcarbonate, and fluoroethylenecarbonate in a volume ratio of about 2:6:2.

Manufacture Example 11: Manufacture of Lithium Secondary Battery (Coin Cell)

0.1 g of the composite of Preparation Example 2, 10 mL of N,N-dimethylformamide (DMF), 0.2 g of poly(diallyldimethylammonium)trifluoro-methanesulfonylimide (poly(diallyldimethylammonium)TFSI) (having a degree of polymerization of about 2500), and 0.2 g of a liquid electrolyte (including 1.3M $LiPF_6$ dissolved in a mixed solvent of ethylenecarbonate (EC), diethylcarbonate (DEC), and fluoroethylenecarbonate (FEC) in a volume ratio of 2:6:2) were mixed together, and stirred at room temperature (about 20-25° C.) for about 5 minutes to prepare an electrolyte (anode protective layer) composition.

The electrolyte composition was coated on a lithium metal thin film (having to a thickness of about 20 μm) by using a doctor blade, and dried at about 40° C. in a vacuum oven for about 12 hours to prepare a lithium metal anode including the electrolyte (anode protective layer).

$LiCoO_2$, a conducting agent (Super-P, available from Timcal Ltd.), polyvinylidene fluoride (PVdF), and N-methylpyrrolidone were mixed together to obtain a cathode composition. A mixed weight ratio of $LiCoO_2$, the conducting agent, and PVDF in the cathode composition was about 97:1.5:1.5.

The cathode composition was coated on an aluminum foil (having a thickness of about 15 μm), dried at about 25° C., and then dried further at about 110° C. in a vacuum, thereby manufacturing a cathode.

The lithium metal anode including the electrolyte (anode protective layer) was disposed on the cathode, and a separator was disposed between the cathode and the electrolyte, thereby manufacturing a lithium secondary battery (having a structure of cathode/separator/electrolyte (anode protective layer)/anode). The separator used was a polypropylene separator (Cellgard 3510).

A liquid electrolyte was further added between the cathode and the electrolyte of the lithium secondary battery. The liquid electrolyte was obtained by dissolving 1.3M $LiPF_6$ as a lithium salt in a mixed solvent of ethylene carbonate, diethylcarbonate, and fluoroethylenecarbonate in a volume ratio of about 2:6:2.

Manufacture Examples 12 and 13: Manufacture of Coin Cells

Coin cells were manufactured in the same manner as in Manufacture Example 1, except that the electrolytes of Examples 10 and 11, instead of the electrolyte of Example 1, were used, respectively.

Comparative Manufacture Example 1: Manufacture of Coin Cell

A coin cell was manufactured in the same manner as in Manufacture Example 1, except that the electrolyte of Comparative Example 1, instead of the electrolyte of Example 1, was used.

Comparative Manufacture Examples 2 to 4: Manufacture of Coin Cells

Coin cells were manufactured in the same manner as in Manufacture Example 1, except that the electrolytes of Comparative Examples 2 to 4, instead of the electrolyte of Example 1, were used, respectively.

Comparative Manufacture Example 8: Manufacture of Lithium Secondary Battery (Full Cell)

$LiCoO_2$, a conducting agent (Super-P, available from Timcal Ltd.), polyvinylidene fluoride (PVdF), and N-methylpyrrolidone were mixed together to obtain a cathode composition. A mixed weight ratio of $LiCoO_2$, the conducting agent, and PVDF in the cathode composition was about 97:1.5:1.5.

The cathode composition was coated on an aluminum foil (having a thickness of about 15 μm), dried at about 25° C., and then dried further at about 110° C. in a vacuum, thereby manufacturing a cathode.

A separator was disposed between the cathode and a lithium metal anode, thereby manufacturing a lithium secondary battery (having a structure of cathode/separator/anode). The separator used was a polypropylene separator (Cellgard 3510).

A liquid electrolyte was further added between the cathode and the anode. The liquid electrolyte was obtained by dissolving 1.3M $LiPF_6$ as a lithium salt in a mixed solvent of ethylene carbonate, diethylcarbonate, and fluoroethylenecarbonate in a volume ratio of about 2:6:2.

Comparative Manufacture Example 9: Manufacture of Lithium Secondary Battery (Full Cell)

A lithium secondary battery was manufactured in the same manner as in Manufacture Example 10, except that no composite was added to prepare the electrolyte composition.

Evaluation Example 1: Scanning Electron Microscopic (SEM) Analysis

1) Preparation Example 1

TiMOF of Preparation Example 1 was analyzed by scanning electron microscopy (SEM) using a Hitachi S-4700 scanning electron microscope. A SEM image of TiMOF of Preparation Example 1 is shown in FIG. 2A.

Figure 2A:
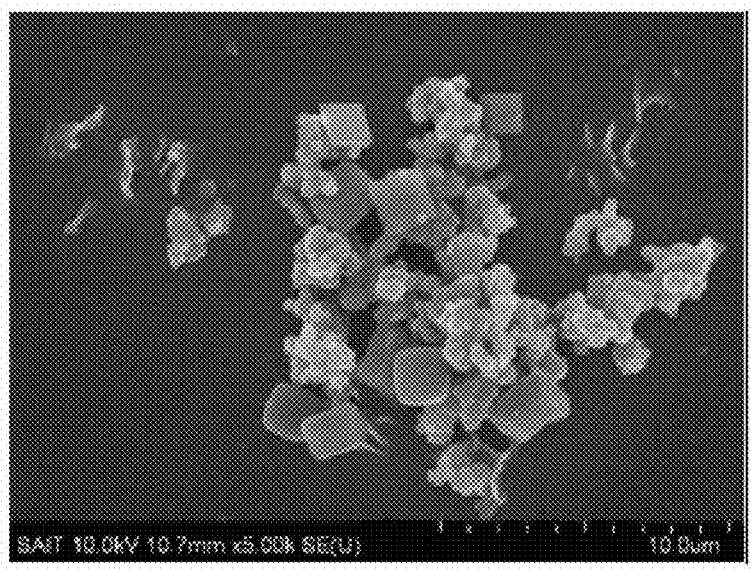
FIGS. 2A and 2B are scanning electron microscopic (SEM) images of TiMOF of Preparation Example 1 and a composite of Preparation Example 2, respectively.

Referring to FIG. 2A, TiMOF of Preparation Example 1 was found to have an average size of about 400 nm.

2) Preparation Example 2

The composite of Preparation Example 2 was analyzed by SEM using a Hitachi S-4700 scanning electron microscope. A SEM image of the composite is shown in FIG. 2B.

Figure 2B:
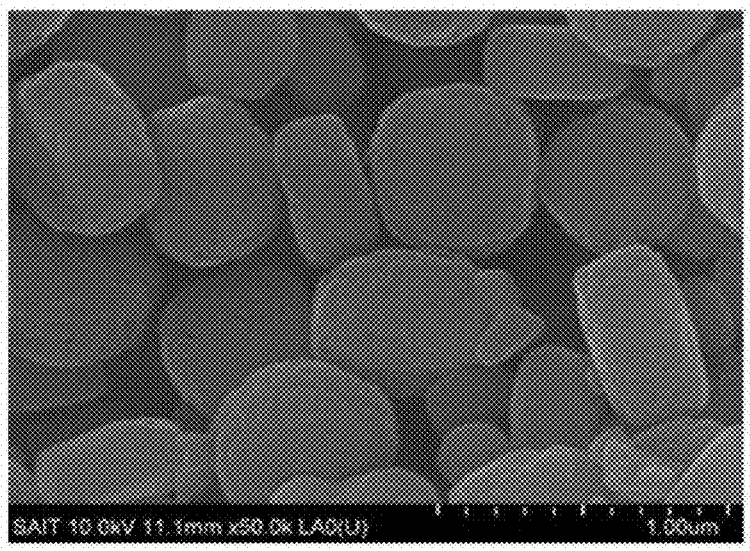

Referring to FIG. 2B, TiMOF in the composite of Preparation Example 2 was found to be as it originally was, not to be structurally damaged or agglomerated, though impregnated with the ionic liquid.

Evaluation Example 2: Measurement of Specific Surface Area and Average Pore Size of TiMOF A specific surface area and an average pore size of TiMOF of Preparation Example 1 were measured. The results are shown in Table 1 and FIGS. 12 and 13.

1) Specific Surface Area

A specific surface area of TiMOF was obtained using a $N_2$ adsorption-desorption isotherm obtained from the nitrogen adsorption test and the Brunauer-Emmett-Teller (BET) method.

2) Average Pore Size

A total pore volume of TiMOF of Preparation Example 1 was obtained based on the specific surface area obtained as described above and the Y-axis of the $N_2$ adsorption-desorption isotherm. A pore size distribution plot was obtained using the total pore volume of TiMOF and a Barrett-Joyner-Halenda (BJH) method. An average pore size of TiMOF was calculated based on the pore size distribution plot.

TABLE 1

| Example | Specific surface area ($m^2/g$) | average pore size (nm) |
|---|---|---|
| Preparation Example 1 | 1120 | 3.55 |

Figure 12:
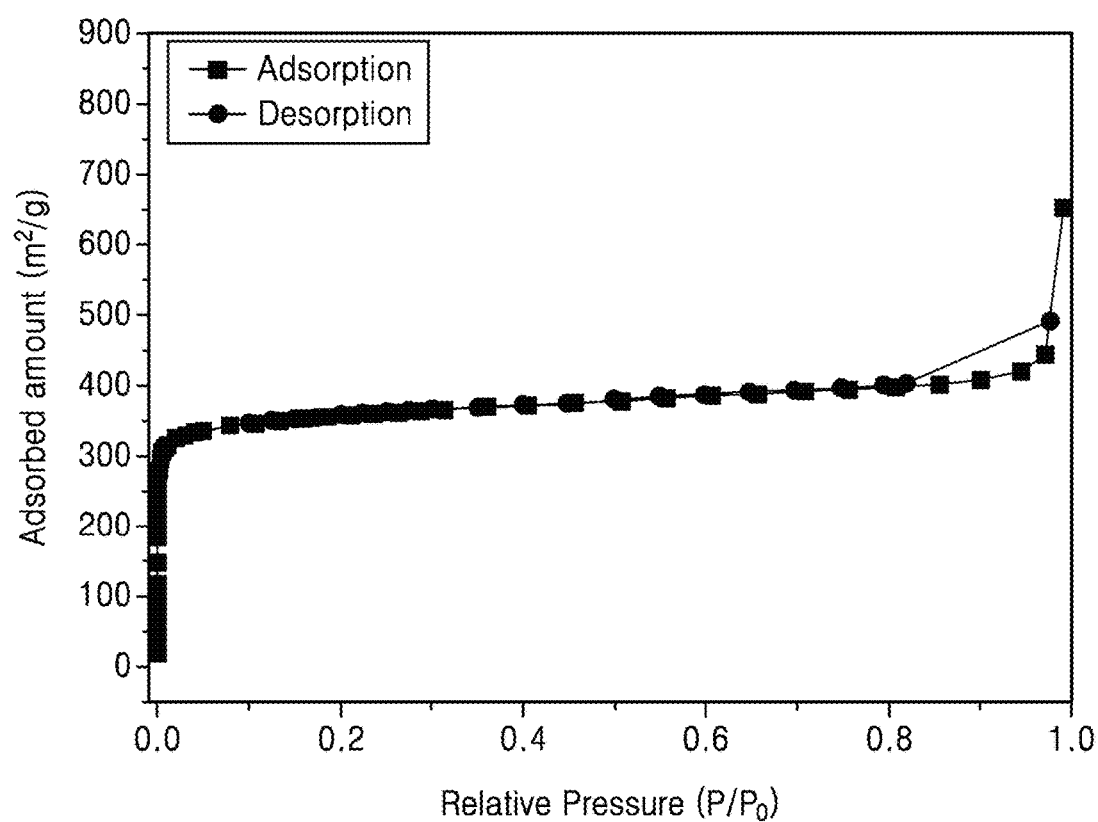
FIG. 12 is a graph of adsorbed amount (square meters per gram, $m^2/g$) versus relative pressure (pressure divided by initial pressure, $P/P_o$) and is an $N_2$ adsorption-desorption isotherm of TiMOF (MIL-125) of the metal-organic framework of Preparation Example 1.
Figure 13:
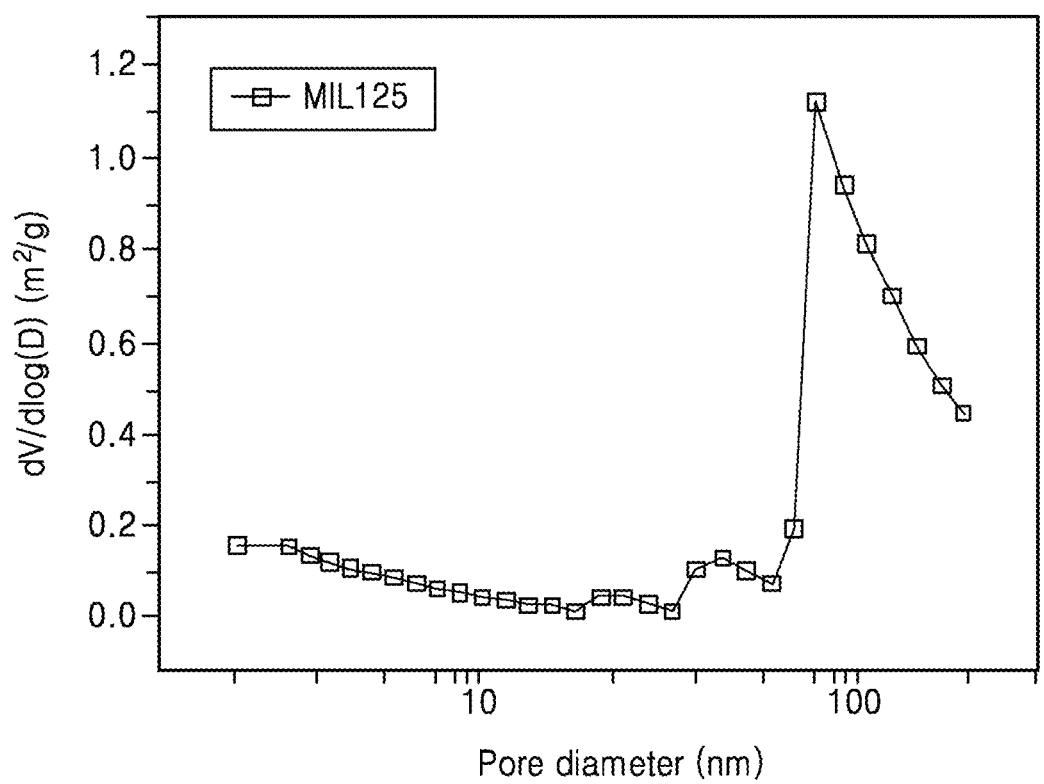
FIG. 13 is a graph of the derivative of volume (dV/d log(D), square meters per gram, $m^2/g$) showing an average pore diameter of TiMOF (MIL-125) of the metal-organic framework of Preparation Example 1.

Referring to FIGS. 12 and 13 and Table 1, the metal-organic framework TiMOF of Preparation Example 1 was found to have a specific surface area of about 1120 $m^2/g$. These results indicate that the metal-organic framework TiMOF of Preparation Example 1 had a mesoporous structure with a large specific surface area of 1000 $m^2/g$ or greater, and thus has a structure suitable to be impregnated with ionic liquid.

Evaluation Example 3: X-Ray Diffraction Analysis

The electrolyte of Example 1 and the electrolyte of Comparative Example 2 were analyzed by X-ray diffraction analysis using a Rigaku RINT2200HF diffractometer with CuK-α radiation (1.540598 Å). The X-ray diffraction analysis results are shown in FIG. 3.

Figure 3:
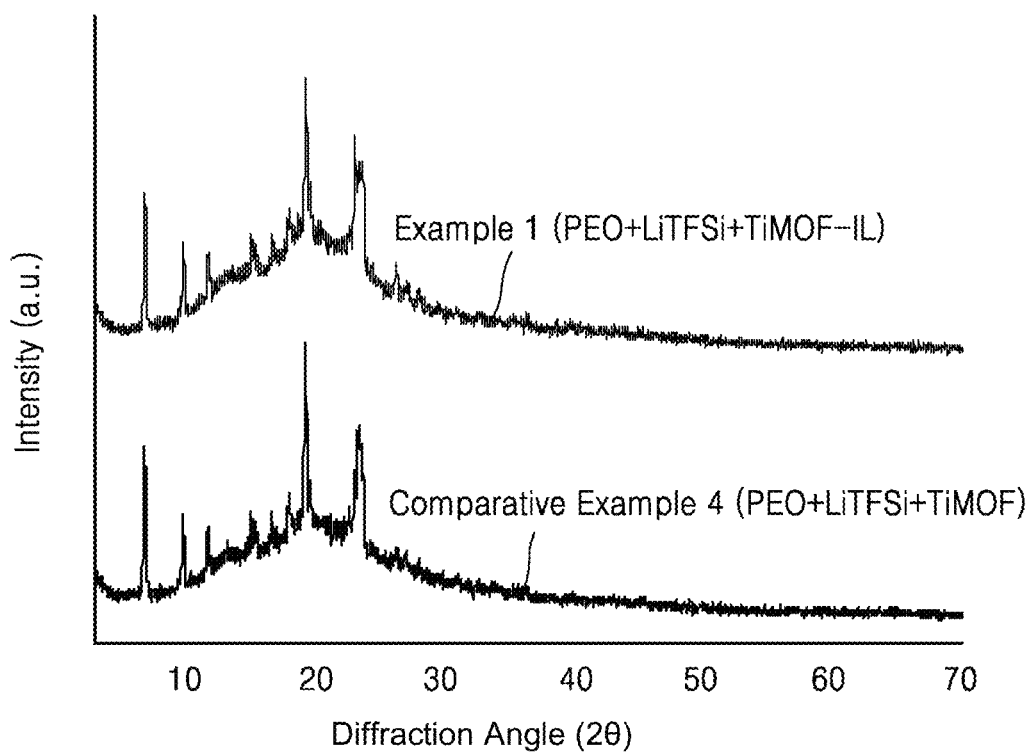
FIG. 3 is a graph of intensity (arbitrary units) versus diffraction angle (degrees two-theta, $2\theta$) illustrating the results of X-ray diffraction analysis with CuK-$\alpha$ radiation on the electrolyte of Example 1 and an electrolyte of Comparative Example 2.

Referring to FIG. 3, the electrolyte of Example 1 including the composite using ionic liquid-impregnated TiMOF was found to maintain the original porous structure and crystallinity of TiMOF, like the electrolyte of Comparative Example 2 including TiMOF, indicating the microstructure of TiMOF in the electrolyte of Example 1 may remain almost unchanged due to the impregnation with ionic liquid, as in the electrolyte of Comparative Example 2 including TiMOF not impregnated with ionic liquid.

Evaluation Example 4: Thermogravimetric Analysis (TGA)

TiMOF of Preparation Example 1 and the composite ((TiMOF)+IL) of Preparation Example 2 were analyzed by thermogravimetric analysis (TGA) using a thermogravimetric analyzer (TA Instrument, SDF-2960). The TGA results are shown in FIG. 4.

Figure 4:
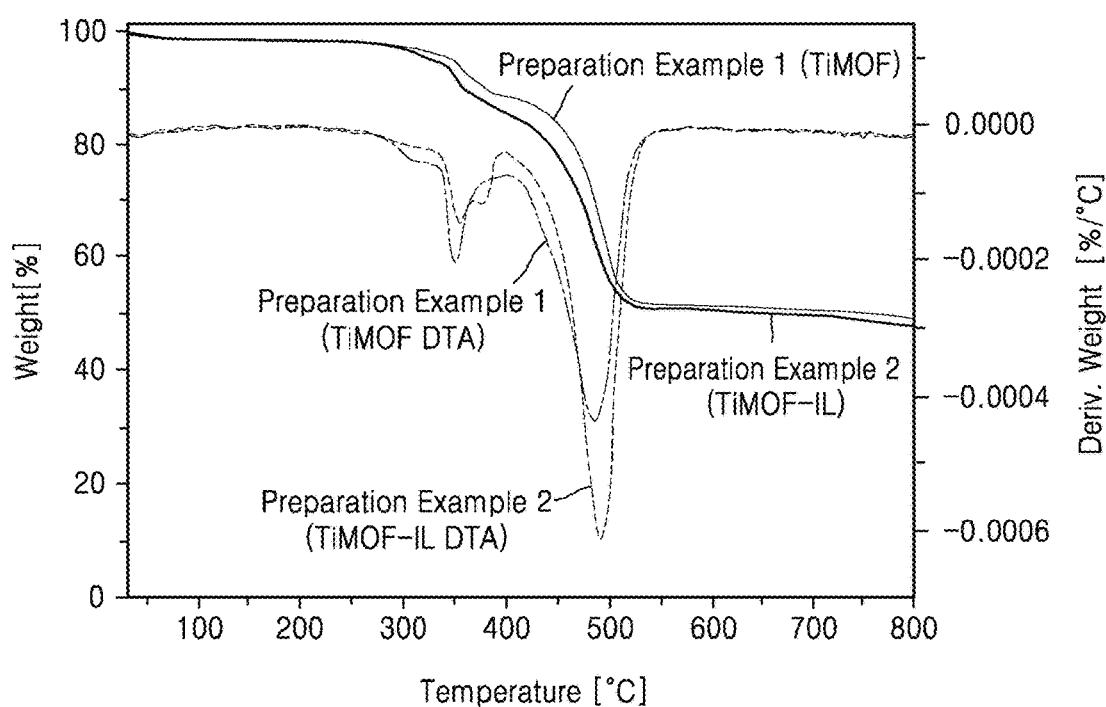
FIG. 4 is a graph of weight (percent, %) versus temperature (° C.) illustrating the results of thermogravimetric analysis (TGA) on TiMOF of Preparation Example 1 and the composite ((TiMOF)+IL) of Preparation Example 2.

Referring to FIG. 4, the composite of Preparation Example 2 was found to have a thermogravimetric loss of about 4.7 wt % at a temperature of about 300° C. to about 400° C. This thermogravimetric loss is attributed to the ionic liquid, which is found from comparison with a TGA plot of TiMOF of Preparation Example 1.

Evaluation Example 5: Ionic Conductivity Measurement

1) Example 1, Example 6, Comparative Example 1, and Comparative Example 2 and Comparative Example 5

Figure 5A:
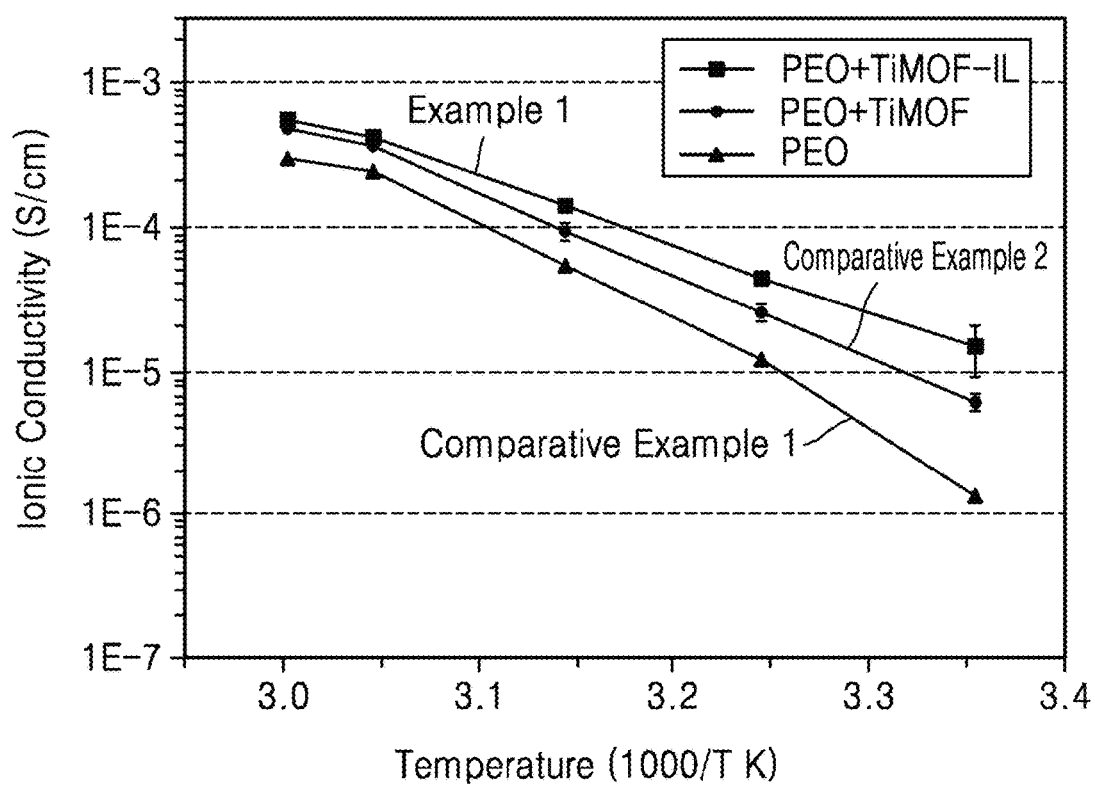
FIG. 5A is a graph of ionic conductivity with respect to the inverse of temperature (1000/temperature, Kelvin (K)) in the electrolytes of Example 1 and Comparative Examples 1 and 2.
Figure 5B:
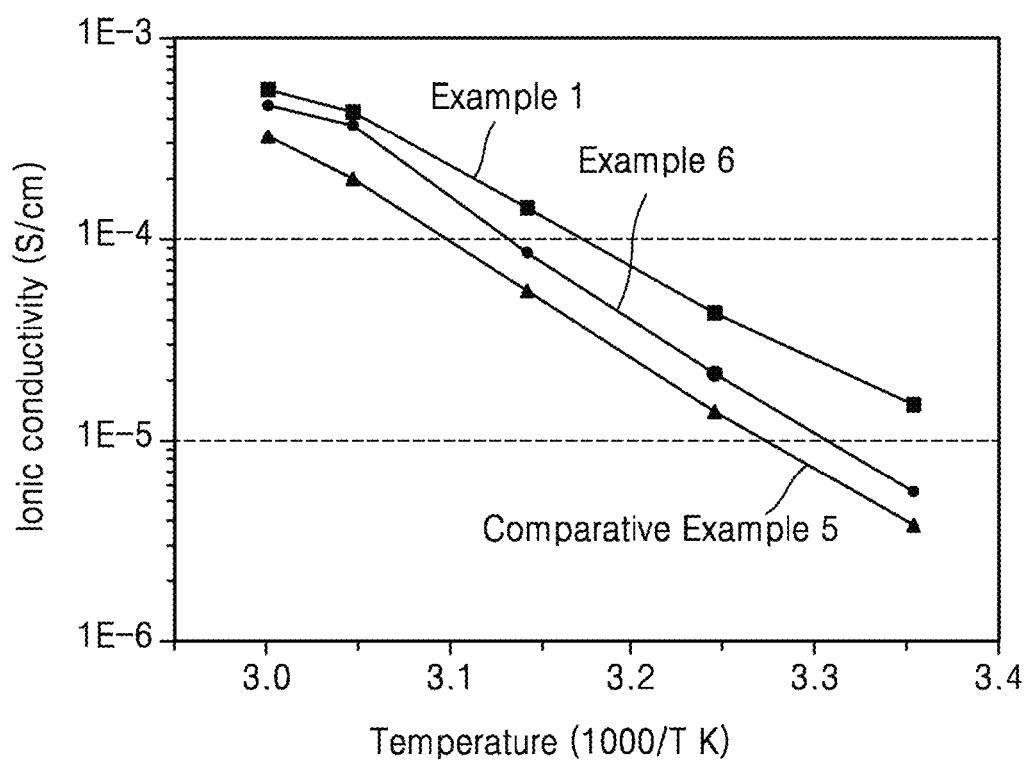
FIG. 5B is a graph of ionic conductivity with respect to the inverse of temperature (1000/temperature, Kelvin (K)) in the electrolytes of Examples 1 and 6 and Comparative Example 5.

Ionic conductivities of the electrolytes of Examples 1 and 2 and Comparative Examples 1, 2 and 5 were measured as follows. The resistance of each of the electrolytes of Examples 1 and 2 and Comparative Examples 1, 2, and 5 was measured while scanning temperature thereof with a bias voltage of about 10 mV in a frequency range of about 1 Hz to 1 MHz to evaluate an ionic conductivity thereof. The results are shown in FIG. 5. The ionic conductivities at 25° C. of the electrolytes of Examples 1 and 2 and Comparative Examples 1, 2, and 5 are shown in Table 2.

TABLE 2

| Example | Ionic conductivity at 25° C. (S/cm) |
| --- | --- |
| Example 1 | $1.52 \times 10^{-5}$ |
| Example 6 | $5.59 \times 10^{-6}$ |
| Comparative Example 1 | $1.37 \times 10^{-6}$ |
| Comparative Example 2 | $6.25 \times 10^{-6}$ |
| Comparative Example 5 | $3.76 \times 10^{-6}$ |

Referring to FIG. 5 and Table 2, the electrolyte of Example 1 is found to have improved ionic conductivity compared to the electrolytes of Comparative Examples 1, 2 and 5. The electrolyte of Example 6 is found to have improved ionic conductivity compared to the electrolyte of Comparative Examples 1 and 5, but a slightly lower ionic conductivity compared to the electrolyte of Comparative Example 2. The electrolyte of Example 1 including TiMOF had a higher ionic conductivity than the electrolyte of Example 6 including AlMOF.

2) Examples 1 to 11 and Comparative Examples 1 to 3

Figure 6:
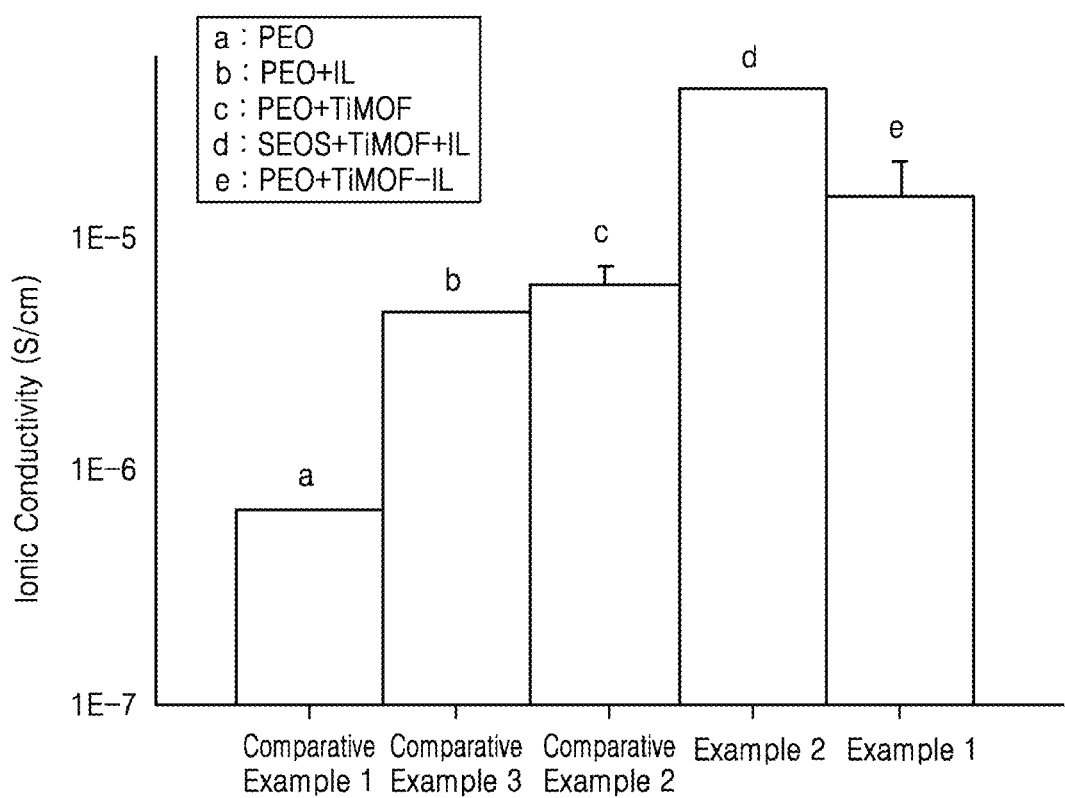
FIG. 6 is a graph of ionic conductivities of the electrolytes of Examples 1 and 2 and Comparative Examples 1 to 3.

The ionic conductivities of the electrolytes of Examples 1 to 11 and Comparative Examples 1 to 3 were measured in the same manner as for the electrolytes of Examples 1 and 6 and Comparative Examples 1, 2 and 5. Some of the results are shown in FIG. 6. In FIG. 6, SEOS indicates a polystyrene-b-polyethylene oxide-b-polystyrene block copolymer.

The electrolytes of Examples 1 and 2, which include composites including TiMOF impregnated with ionic liquid, were found to have improved ionic conductivities, indicating that an ionic liquid may improve the ionic conductivity of electrolyte.

The electrolytes of Examples 3 to 11 were found to have similar ionic conductivities to those of the electrolytes of Examples 1 and 2.

Evaluation Example 6: Lithium Ion Transference Number

1) Examples 1 to 11 and Comparative Examples 1 and 2

Lithium ion transference number ($t_{Li+}$) of the electrolytes of Examples 1 to 11 and Comparative Examples 1 and 2 were evaluated in the following manner.

The lithium ionic mobilities were calculated using Equation 2.

A current decay with time with respect to an impedance and an input voltage of a lithium symmetric cell or a stainless steel (SUS) symmetric cell were measured and used to calculate the Lithium ion transference number (see, for example, Electrochimica Acta 93 (2013) 254, the content of which is incorporated herein by reference).

$$t_{Li+} = \frac{i_{SS}(\Delta V - i_O R^0)}{i_O(\Delta V - i_{SS} R^{SS})} \quad \text{Equation 2}$$

In Equation 2, $i_o$ indicates an initial current, $i_{ss}$ indicates a steady state current, $R^0$ indicates an initial resistance, and $R^{ss}$ indicates a steady state resistance.

Figure 7:
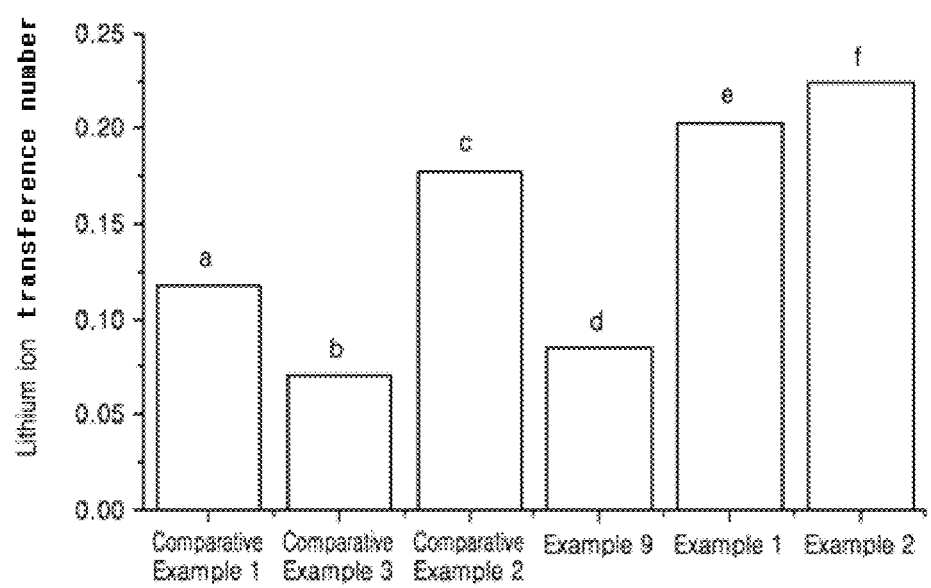
FIG. 7 is a graph of lithium ion transference number ($t_{Li+}$) of the electrolytes of Examples 1 and 2, Example 9, and Comparative Examples 1 and 2.

Some of the results of the lithium ionic mobility evaluation are shown in FIG. 7 and Table 3.

TABLE 3

| Example | Lithium ion transference number |
| --- | --- |
| Example 1 | 0.203 |
| Example 9 | 0.085 |
| Comparative Example 1 | 0.118 |
| Comparative Example 2 | 0.078 |
| Comparative Example 3 | 0.118 |

Referring to FIG. 7 and Table 3, the electrolytes of Examples 1 and 2 were found to effectively prevent deterioration in lithium ionic mobility, due to the impregnation of TiMOF with ionic liquid. The electrolytes of Examples 1 and 2 were found to have improved lithium ion transference number_compared to the electrolytes of Comparative Examples 1 to 3.

The electrolytes of Examples 3 to 8, 10 and 11 were found to have similar lithium ion transference number_to those of the electrolytes of Examples 1 and 2.

Evaluation Example 7: Electrochemical Stability

Figure 8:
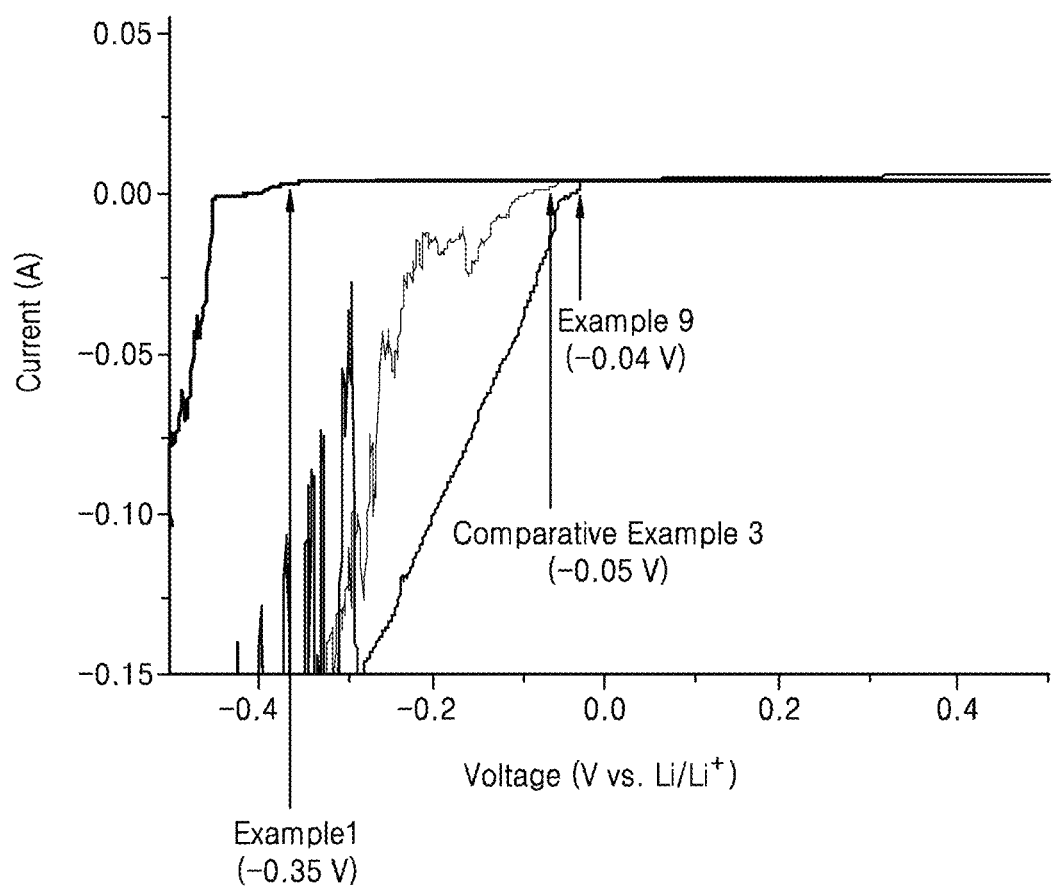
FIG. 8 is a graph of current (amperes, A) versus voltage (volts versus Li/Li$^+$) illustrating the results of linear sweep voltammetry (LSV) on cells including the electrolytes of Examples 1 and 9 and Comparative Example 3, respectively.

Each of the electrolytes of Example 1, Example 9, and Comparative Example 3 was disposed between a lithium electrode and a stainless steel (SUS) electrode to manufacture a cell. Electrochemical stabilities of the cells were analyzed by linear sweep voltammetry (LSV). The results are shown in FIG. 8 and Table 4.

The measurement conditions for LSV were as follows: a voltage range of about −0.4V to about 0.4V (with respect to Li/Li+), a scan rate of about 0.5 mV/s, and a temperature of about 25° C.

TABLE 4

| Example | Electrochemical stability (V) |
| --- | --- |
| Example 1 | −0.35 |
| Example 9 | −0.04 |
| Comparative Example 1 | −0.05 |

Referring to FIG. 8 and Table 4, the electrolyte of Example 1 was found to have improved electrochemical stability, compared to the cell including the electrolyte of Comparative Example 3. For the electrolyte of Example 1, a decomposition peak of the ionic liquid appeared at about 0.35V. For the electrolyte of Example 9 including the composite in which TiMOF is simply mixed with ionic liquid, a decomposition peak of the ionic liquid appeared at about −0.04V. These results indicate that the impregnation of ionic liquid into TiMOF may prevent deterioration in electrochemical stability caused by free, nonimpregnated ionic liquid at low voltages.

Evaluation Example 8: Tensile Modulus

Tensile moduli of the electrolytes of Examples 1 to 11 and Comparative Examples 1, 2, 3 and 5 were measured using a DMA800 (available from TA Instruments). Electrolyte samples for tensile modulus measurement were prepared according to the ASTM standard D412 (Type V specimens). The tensile modulus is also known as Young's modulus.

Figure 9:
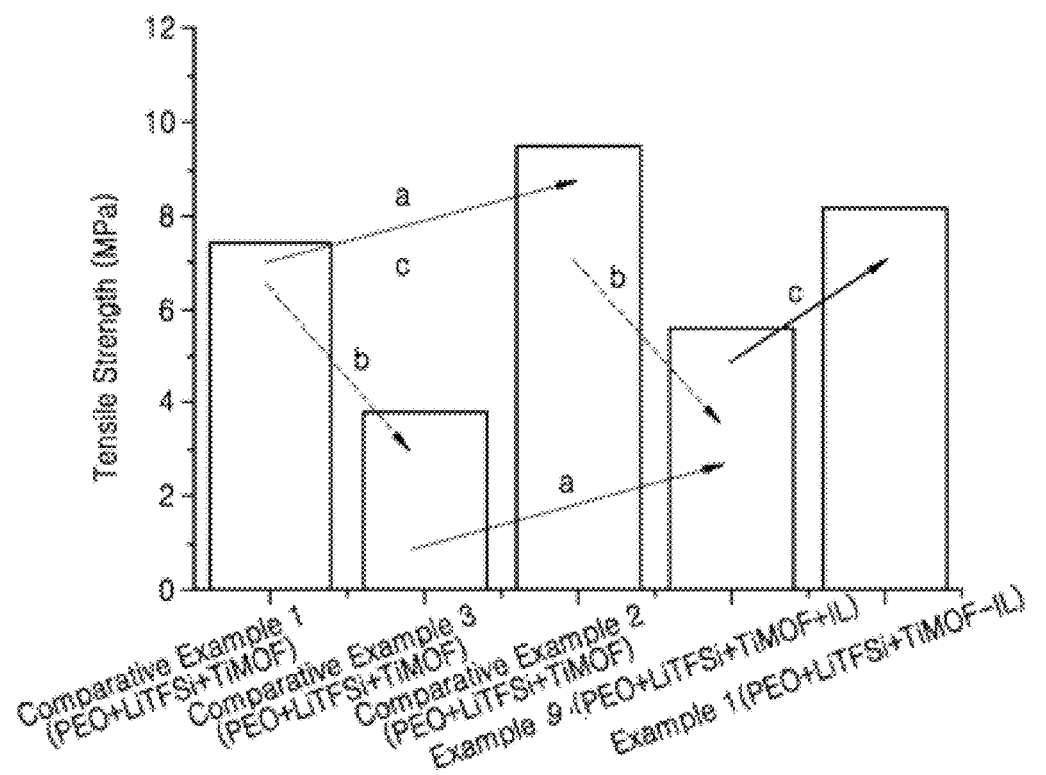
FIG. 9 is a graph illustrating the results of tensile modulus measurement using the electrolytes of Examples 1 and 9 and Comparative Examples 1 to 3.

Strain (i.e., change in dimensions or shape) of each electrolyte against stress was measured at about 25° C., a relative humidity of about 30%, and a rate of 5 mm/min. The results are shown in FIG. 9. The tensile modulus of each electrolyte was obtained based on the slope of stress-strain curves in FIG. 9. The results are shown in Table 5.

TABLE 5

| Example | Tensile modulus (MPa) |
| --- | --- |
| Example 1 | 8.168 |
| Comparative Example 1 | 7.395 |
| Comparative Example 2 | 3.819 |
| Comparative Example 3 | 5.599 |

Referring to FIG. 9 and Table 5, when TiMOF was added (refer to the indication by "a" in FIG. 9), the electrolyte of Example 9 was found to have increased tensile strengths compared with the electrolyte of Comparative Example 3. When ionic liquid was added (refer to the indication by "b"), the electrolyte of Example 9 was found to have reduced tensile strengths compared with the electrolyte of Comparative Example 2. However, the electrolyte of Example 1 using the composite in which ionic liquid was impregnated into TiMOF was found to have an improved tensile strength, compared to the electrolyte of Example 9 in which ionic liquid was simply mixed with TiMOF (refer to the indication by "c"). These results indicate that using a structure in which ionic liquid is impregnated into TiMOF may prevent deterioration in mechanical properties such as mechanical strength) of an electrolyte.

The electrolytes of Examples 2 to 8, 10, and 11 were found to have similar tensile strengths as that of the electrolyte of Example 1.

The electrolyte of Comparative Example 5 had highly sticky and weak characteristics, and a stress-strain curve thereof was not attainable using a mechanical physical characteristic measurement. That is because the electrolyte of Comparative Example 5 provides reduced homogeneous membrane characteristics due to two random phases in the electrolyte, a deintercalation of the ionic liquid from the pore of MCM-48 into the electrolyte may occur due to a large pore size of about 200 nm or greater of MCM 48 impregnated with the ionic liquid, and the electrolyte has reduced mechanical characteristics due to such a large pore size of MCM-48.

Evaluation Example 9: Charge-Discharge Test

1) Manufacture Example 6, Manufacture Examples 10 to 12, Comparative Manufacture Examples 8 and 9

Figure 10:
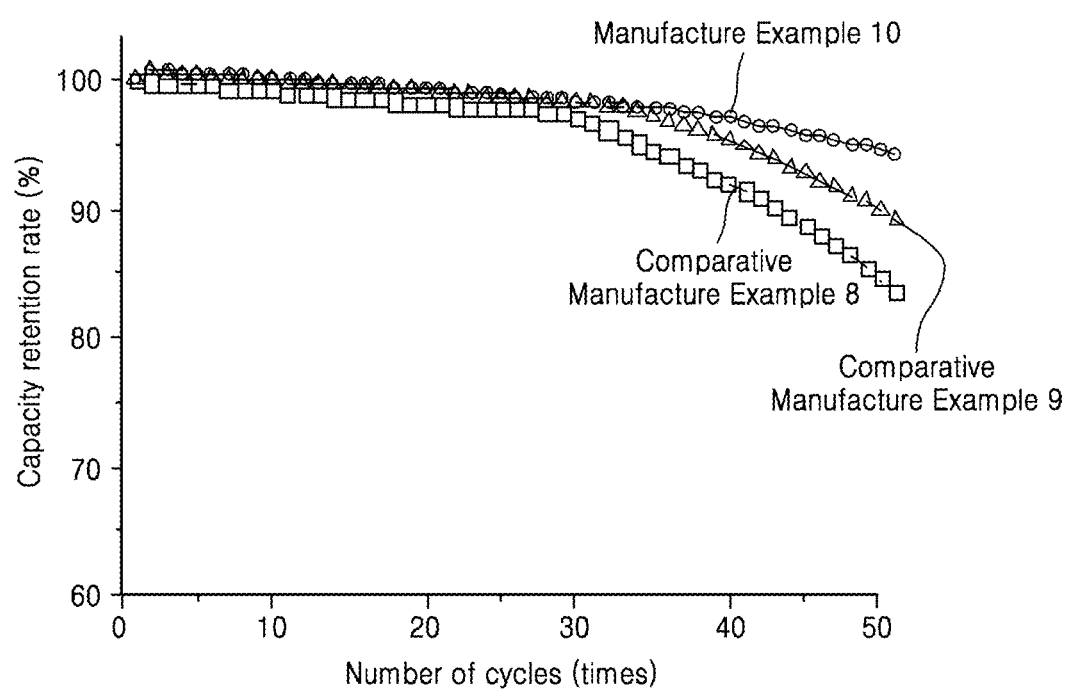
FIG. 10 is a graph of capacity retention rate with respect to cycle number in lithium secondary batteries of Manufacture Example 10 and Comparative Manufacture Examples 8 and 9.

Each of the lithium secondary batteries of Manufacture Example 6, Manufacture Examples 10 to 12, and Comparative Manufacture Examples 8 and 9 was subjected to 50 cycles of charging and discharging at room temperature (about 20-25° C.) in a voltage range of about 3.0V to about 4.4V (with respect to lithium metal) at a constant current of about 0.76 mA/cm². Some of the results from the cycle charge-discharge test are shown in FIG. 10.

Capacity retention rates of the lithium secondary batteries after $50^{th}$ cycle were calculated using Equation 3. The results are shown in Table 6.

$$\text{Capacity retention rate (\%)} = [50^{th} \text{ cycle discharge capacity}/1^{st} \text{ cycle discharge capacity}] \times 100 \quad \text{Equation 3}$$

TABLE 6

| Example | $50^{th}$ cycle capacity retention rate [%] |
| --- | --- |
| Manufacture Example 10 (Polymerization product of ETPTA + (TiMOF-IL)) | 94.5 |
| Comparative Manufacture Example 8 (bare Li) | 84.6 |
| Comparative Manufacture Example 9 (Polymerization product of ETPTA) | 89.8 |

Referring to Table 6 and FIG. 10, the lithium secondary battery of Manufacture Example 10 was found to have a significantly improved capacity retention rate, compared to the lithium secondary batteries of Comparative Manufacture Examples 8 and 9. The lithium secondary batteries of Manufacture Examples 6, 11, and 12 were found to have similar capacity retention rates to that of the lithium secondary battery of Manufacture Example 10. These results support that the electrolyte of the lithium secondary batteries of Manufacture Examples 6, 10, 11, and 12 serves as a good lithium anode protective layer.

2) Manufacture Example 11 and Comparative Manufacture Example 8

Figure 11:
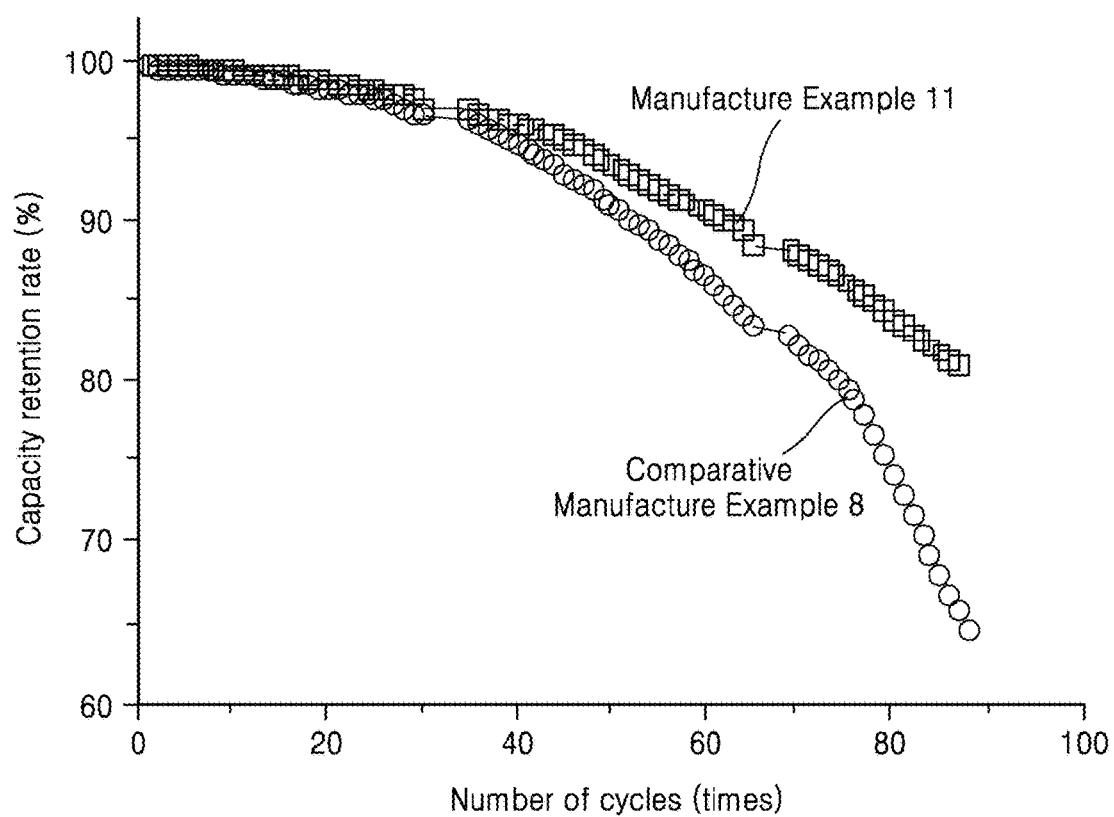
FIG. 11 is a graph of capacity retention rate with respect to cycle number in lithium secondary batteries of Manufacture Example 11 and Comparative Manufacture Example 8.

Each of the lithium secondary batteries of Manufacture Example 11 and Comparative Manufacture Example 8 was subjected to 100 cycles of charging and discharging at room temperature (about 20-25° C.) in a voltage range of about 3.0V to about 4.4V with respect to lithium metal at a constant current of about 0.76 mA/cm². The results from the cycle charge-discharge test are shown in FIG. 11. Capacity retention rates of the lithium secondary batteries after 88$^{th}$ cycle are shown in Table 7.

TABLE 7

| Example | 88$^{th}$ cycle capacity retention rate (%) |
|---|---|
| Manufacture Example 11 (PIL-(TiMOF-IL)) | 81.3 |
| Comparative Manufacture Example 8 (bare Li) | 65.9 |

Referring to Table 7 and FIG. 11, the lithium secondary battery of Manufacture Example 11 was found to have a higher capacity retention rate than that of the lithium secondary battery of Comparative Manufacture Example 8, indicating that the electrolyte of the lithium secondary battery of Manufacture Example 11 serves as a good lithium anode protective layer.

Evaluation Example 10: Electrolyte's Degree of Crystallinity Evaluation

Figure 14:
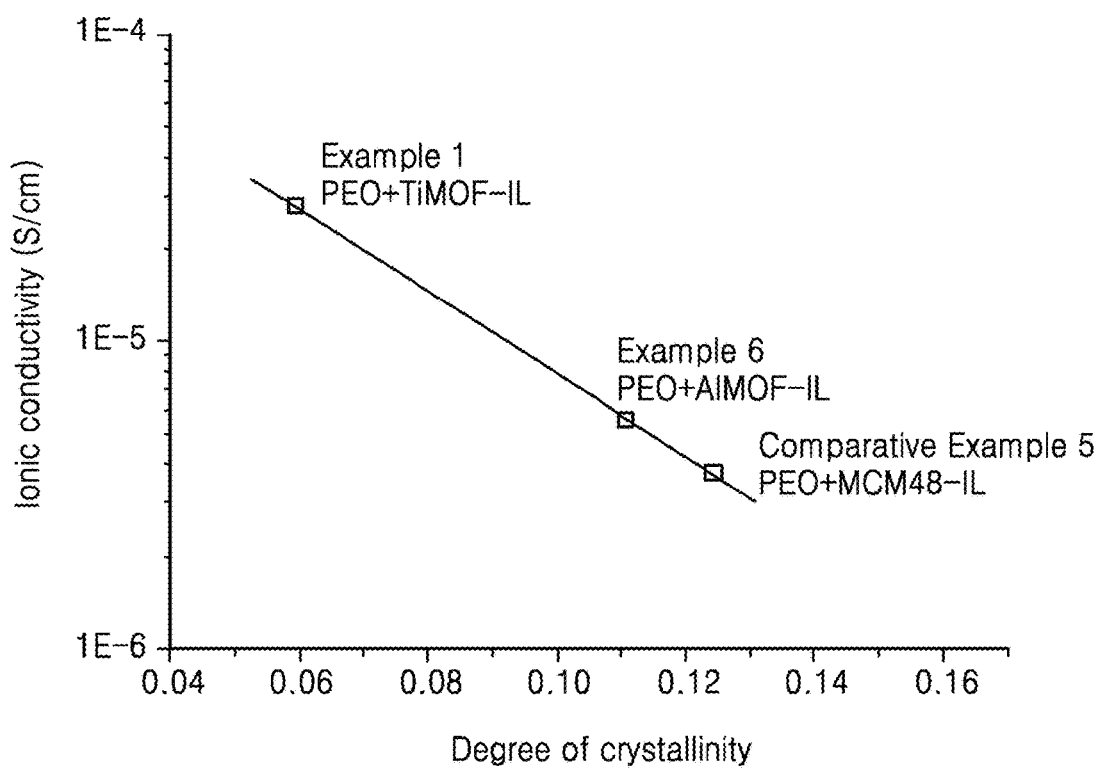
FIG. 14 is a graph of ionic conductivity (Siemens per centimeter, S/cm) versus degree of crystallinity illustrating crystalline characteristics of the electrolytes of Examples 1 and 6 and Comparative Example 5.

Crystallinity characteristics of the electrolytes of Examples 1 and 6 and Comparative Example 5 were evaluated by X-ray diffraction (XRD) analysis using a diffractometer (Bruker D8 ADVANCE). The results are shown in FIG. 14. In FIG. 14, the degree of crystallinity was calculated according to Equation 4.

$$DOC=[A_{cry}/(A_{cry}+A_{amo})]$$  Equation 4

In Equation 4, "$A_{cry}$" indicates the "area of crystalline phase", which is a total area of two peaks (i.e., a sum of the area of a first peak ($A_{cry1}$) and the area of a second peak ($A_{cry2}$) at a 2θ of 19° and 23°, respectively) indicating crystalline phase in XRD data; and "$A_{cry}+A_{amo}$" indicates the sum of the "area of crystalline phase and the area of amorphous phase", which is a total area of the peaks indicating crystalline phase in XRD data based on the horizontal plane of X-axis.

Referring to FIG. 14, the electrolyte of Comparative Example 5 was found to have a higher degree of crystallinity compared to the electrolytes of Examples 1 and 6. From the results of FIG. 4 and Table 2, it is found that ionic conductivities at room temperature of the electrolytes and degrees of crystallinity thereof are in inverse proportion to each other, and the electrolyte of Comparative Example 5 is relatively less effective in reducing the degree of crystallinity of polyethylene oxide polymer.

As described above, according to the one or more of the above embodiments of the present disclosure, by using composite that includes a metal-organic framework and an ionic liquid impregnated into the metal-organic framework, an electrolyte with improved ionic conductivity, improved lithium ionic mobility, and improved electrochemical stability may be prepared without deterioration in mechanical properties. A lithium secondary battery with improved cell performance may be manufactured using the electrolyte.

It should be understood that the exemplary embodiments described therein should be considered in a descriptive sense only and not for purposes of limitation. Descriptions of features or aspects within each embodiment should typically be considered as available for other similar features or aspects in other embodiments. While one or more embodiments of the present disclosure have been described with reference to the figures, it will be understood by those of ordinary skill in the art that various changes in form and details may be made therein without departing from the spirit and scope of the present disclosure as defined by the following claims.

What is claimed is:

1. A composite comprising:
a metal-organic framework; and
an ionic liquid disposed in a pore defined by the metal-organic framework, wherein an amount of the ionic liquid is in a range of about 0.1 parts to about 20 parts by weight, based on 100 parts by weight of a total weight of the composite,
wherein the metal-organic framework is a compound represented by Formula 1:

$$M_mO_kX_lL_p$$  Formula 1 wherein, in Formula 1,
M is at least one selected from Ti$^{4+}$, Zr$^{4+}$, Mn$^{4+}$, Si$^{4+}$, Al$^{3+}$, Cr$^{3+}$, V$^{3+}$, Ga$^{3+}$, Mn$^{3+}$, Zn$^{+3}$, Mn$^{2+}$, Mg$^{2+}$, Fe$^{2+}$, Fe$^{3+}$, and Cu$^{+2}$,
m is an integer of 1 to 10,
k is 0 or an integer of 1 to 10,
l is 0 or an integer of 1 to 10,
p is an integer of 1 to 10,
X is H, OH$^-$, Cl$^-$, F$^-$, I$^-$, Br$^-$, SO$_4^{2-}$, NO$_3^-$, ClO$_4^-$, PF$_6^-$, BF$_3^-$, R$^1$—(COO)$_n^-$, R$^1$—(SO$_3$)$_n^-$, or R$^1$—(PO$_3$)$_n^-$, where R$^1$ is at least one selected from a hydrogen and a C1-C30 alkyl group,
n is an integer of 1 to 4, and
L is a ligand of the formula R—(*COO—#)$_q$, wherein q is an integer of 1 to 6, * indicates a binding site of the carboxylate group to R, # indicates a binding site of the carboxylate group to metal ion M, and R is selected from a substituted or unsubstituted C1-C30 alkyl group, a substituted or unsubstituted C2-C30 alkenyl group, a substituted or unsubstituted C2-C30 alkynyl group, a substituted or unsubstituted monocyclic C6-C30 aryl group, a substituted or unsubstituted polycyclic C10-C30 aryl group, a substituted or unsubstituted monocyclic C3-C30 heteroaryl group, and a substituted or unsubstituted polycyclic C10-C30 heteroaryl group, and wherein,
when M is Zr$^{4+}$, Cr$^{3+}$, Zn$^{+3}$, Mn$^{2+}$, Mg$^{2+}$, or Cu$^{+2}$, at least one of k and l is an integer of 1 to 10,
when M is Cr$^{3+}$, X is Cl—, I—, Br—, SO$_4^{2-}$—, NO$_3$—, ClO$_4$—, PF$_6$—, BF$_3^-$, R$_1$—(COO)$_n^-$, R$_1$—(SO$_3$)$_n^-$, or R$_1$—(PO$_3$)$_n^-$, and
when M is Al$^{3+}$, Fe$^{2+}$, or Fe$^{3+}$, X is Cl—, F—, I—, Br—, SO$_4^{2-}$, NO$_3^-$, ClO$_4^-$, PF$_6^-$, BF$_3$—, R$_1$—(COO)n-, R$_1$—(SO$_3$)n-, or R$_1$—(PO$_3$)n-.

2. The composite of claim 1, wherein the metal-organic framework is a compound represented by Formula 2:

$$M'_mO_kX'_lL'_p$$  Formula 2 wherein, in Formula 2,
M' is at least one selected from Ti$^{4+}$, Zr$^{4+}$, V'', Zn$^{+3}$, Fe$^{2+}$, Fe$^{3+}$, and Cu$^{+2}$,
L' is at least one selected from C$_6$H$_4$(CO$_2^-$)$_2$, C$_2$H$_2$(CO$_2^-$)$_2$, C$_4$H$_4$(CO$_2^-$)$_2$, C$_5$H$_3$S(CO$_2^-$)$_2$, C$_6$H$_2$N$_2$(CO$_2$)$_2$, C$_2$H$_4$(CO$_2^-$)$_2$, C$_3$H$_6$(CO$_2^-$)$_2$, C$_4$H$_8$(CO$_2^-$)$_2$, C$_{10}$H$_6$(CO$_2^-$)$_2$, C$_{12}$H$_8$(CO$_2^-$)$_2$, C$_{12}$H$_8$N$_2$(CO$_2^-$)$_2$, C$_6$H$_3$(CO$_2^-$)$_3$, C$_6$H$_3$(CO$_2^-$)$_3$, C$_{24}$H$_{15}$(CO$_2^-$)$_3$, C$_6$H$_2$(CO$_2^-$)$_4$, C$_{10}$H$_4$(CO$_2^-$)$_4$, C$_{10}$H$_4$(CO$_2^-$)$_4$, and C$_{12}$H$_6$(CO$_2^-$)$_4$,
X' is at least one selected from OH$^-$, Cl$^-$, F$^-$, CH$_3$COO$^-$, PF$_6^-$, and ClO$_4^-$, m is an integer of 1 to 8,
k is 0 or an integer of 1 to 8,
l is 0 or an integer of 1 to 8, and
p is an integer of 1 to
wherein,
when M is $Zr^{4+}$, $Cr^{3+}$, $Zn^{+3}$, $Mn^{2+}$, $Mg^{2+}$, or $Cu^{+2}$, at least one of k and l is an integer of 1 to 8,
when M is $Cr^{3+}$, X is Cl—, I—, Br—, $SO_4^{2-}$, $NO_3^-$, $ClO_4^-$, $PF_6^-$, $BF_3^-$, $R_1$—$(COO)_n^-$, $R_1$—$(SO_3)_n^-$, or $R_1$—$(PO_3)_n^-$, and
when M is $Al^{3+}$, $Fe^{2+}$, or $Fe^{3+}$, X is Cl—, F—, I—, Br—, $SO_4^{2-}$, $NO_3^-$, $ClO_4^-$, $PF_6^-$, $BF_3^-$, $R_1$—(COO)n-, $R_1$—$(SO_3)$n-, or $R_1$—$(PO_3)$n-.

3. The composite of claim 1, wherein the metal-organic framework is at least one selected from $Cu(bpy)(H_2O)_2(BF_4)_2$(bpy) wherein bpy is 4,4'-bipyridine, $Ti_8O_8(OH)_4[O_2C$—$C_6H_4$—$CO_2]_6$, $Ti_8O_8(OH)_4[O_2C$—$C_6H_3(NH_2)$—$CO_2]_6$, $VO[C_6H_4(CO_2)_2]$, $Al(OH)[C_6H_4(CO_2)_2]$, $Cr_3OX_l[C_6H_4(CO_2)_2]_3$ wherein X is at least one selected from $Cl^-$, $CH_3COO^-$, $PF_6^-$, and $ClO_4^-$, and l is 0 or an integer of 1 to 8, $Cr_3OX_l[C_{12}H_8(CO_2)_2]_3$ wherein X is at least one selected from $Cl^-$, $CH_3COO^-$, $PF_6^-$, and $ClO_4^-$, and l is 0 or an integer of 1 to 8, $Cr_3OX_l[C_6H_3(CO_2)_3]_3$ wherein X is at least one selected from $Cl^-$, $CH_3COO^-$, $PF_6^-$, and $ClO_4^-$, and l is 0 or an integer of 1 to 8, $Al_8(OH)_{15}(H_2O)_3[C_6H_3(CO_2)_3]_3$, $V_3OX_l[C_6H_3(CO_2)_3]_3$ wherein X is at least one selected from —H, $OH^-$, $Cl^-$, $F^-$, $CH_3COO^-$, $PF_6^-$, and $ClO_4^-$, and l is 0 or an integer of 1 to 8, $ZrO[C_6H_4(CO_2)_2]$, and $Ti_8O_8(OH)_4[O_2C$—$C_6H_3(NH_2)$—$CO_2]_6$.

4. The composite of claim 1, wherein the ionic liquid comprises at least one compound selected from compounds each comprising
a cation of at least one selected from an ammonium, a pyrrolidinium, a pyridinium, a pyrimidinium, an imidazolium, a piperidinium, a pyrazolium, an oxazolium, a pyridazinium, a phosphonium, a sulfonium, and a triazolium, and
at least one anion selected from $BF_4^-$, $PF_6^-$, $AsF_6^-$, $SbF_6^-$, $AlCl_4^-$, $HSO_4^-$, $ClO_4^-$, Cl—, Br—, I—, $CF_3SO_3^-$, $CF_3CO_2^-$, $NO_3^-$, $Al_2Cl_7^-$, $CH_3COO^-$, $CH_3SO_3^-$, $(CF_3SO_2)_3C^-$, $(CF_3CF_2SO_2)_2N^-$, $(CF_3SO_2)_2N^-$, $(FSO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(C_2F_5SO_2)(CF_3SO_2)N^-$ and $(O(CF_3)_2C_2(CF_3)_2O)_2PO^-$.

5. The composite of claim 1, wherein the ionic liquid is at least one selected from N-methyl-N-propylpyrrolidinium bis(trifluoromethanesulfonyl)imide, N-butyl-N-methylpyrrolidinium bis(3-trifluoromethylsulfonyl)imide, 1-butyl-3-methylimidazolium bis(trifluoromethylsulfonyl)imide, and 1-ethyl-3-methylimidazolium bis(trifluoromethylsulfonyl)imide.

6. The composite of claim 1, wherein the metal-organic framework has a size of about 1 nanometer to about 1 micrometer, a specific surface area of about 100 square meters per gram or greater, and the pore defined by the metal-organic framework has an average diameter of about 0.1 nanometer to about 10 nanometers.

7. The composite of claim 1, further comprising at least one selected from an alkali metal salt and an alkaline earth metal salt.

8. The composite of claim 1, further comprising at least one selected from an alkali metal salt and an alkaline earth metal salt disposed in a pore defined by the metal-organic framework.

9. The composite of claim 1, further comprising an additional metal-organic framework.

10. An electrolyte comprising an ion-conductive polymer and a composite according to claim 1.

11. The electrolyte of claim 10, wherein an amount of the composite is in a range of about 0.1 parts to about 60 parts by weight, based on 100 parts by weight of a total weight of the electrolyte.

12. The electrolyte of claim 10, further comprising at least one selected from an alkali metal salt and an alkaline earth metal salt.

13. The electrolyte of claim 12, wherein the alkali metal salt and the alkaline earth metal salt is at least one selected from LiSCN, $LiN(CN)_2$, $LiClO_4$, $LiBF_4$, $LiAsF_6$, $LiPF_6$, $LiCF_3SO_3$, $Li(CF_3SO_2)_2N$, $LiSbF_6$, $Li(CF_3SO_2)_3C$, $LiN(SO_2C_2F_5)_2$, $LiN(SO_2CF_3)_2$, $LiN(SO_2CF_2CF_3)_2$, $LiN(CF_3SO_2)_2$, $LiPF_3(C_2F_3)_3$, $LiPF_3(C_2F_5)_3$, $LiPF_3(CF_3)_3$, $LiB(C_2O_4)_2$, NaSCN, $NaSO_3CF_3$, KTFSI, NaTFSI, $Ba(TFSI)_2$, $Pb(TFSI)_2$, $Ca(TFSI)_2$, and $LiPF_3(CF_2CF_3)_3$.

14. The electrolyte of claim 12, wherein the at least one selected from the alkali metal salt and the alkaline earth metal salt has a mole ratio of about 1:5 to about 1:30 with respect to an ion-conductive unit of the ion-conductive polymer.

15. The electrolyte of claim 10, wherein the ion-conductive polymer comprises at least one ion-conductive repeating unit selected from a C2-C4 alkylene oxide unit, an acryl unit, a methacryl unit, an ethylene acetate unit, and a siloxane unit.

16. The electrolyte of claim 10, wherein the ion-conductive polymer is at least one selected from polyethylene oxide, polypropylene oxide, polymethyl methacrylate, polyethyl methacrylate, polydimethyl siloxane, polyacrylic acid, polymethacrylic acid, polymethyl acrylate, polyethyl acrylate, poly-2-ethylhexyl acrylate, polybutyl methacrylate, poly-2-ethylhexyl methacrylate, polydecyl acrylate, and polyethylene vinyl acetate.

17. The electrolyte of claim 10, wherein the ion-conductive polymer is a copolymer comprising an ion-conductive repeating unit and a structural repeating unit.

18. The electrolyte of claim 17, wherein the ion-conductive repeating unit is derived from at least one monomer selected from acrylic acid, methacrylic acid, methyl acrylate, methyl methacrylate, ethyl acrylate, ethyl methacrylate, 2-ethylhexyl acrylate, butyl methacrylate, 2-ethylhexyl methacrylate, decyl acrylate, ethylene vinyl acetate, ethylene oxide, and propylene oxide, and
the structural repeating unit is derived from at least one monomer selected from styrene, 4-bromostyrene, tert-butyl styrene, divinyl benzene, methyl methacrylate, isobutyl methacrylate, butadiene, ethylene, propylene, dimethyl siloxane, isobutylene, N-isopropylacrylamide, vinylidene fluoride, acrylonitrile, 4-methylpentene-1, polybutylene terephthalate, ethylene terephthalate, and vinyl pyridine.

19. The electrolyte of claim 10, wherein the ion-conductive polymer is a block copolymer comprising an ion-conductive domain and a structural domain.

20. The electrolyte of claim 19, wherein the block copolymer is at least one selected from an A-B diblock copolymer and an A-B-A' or a B-A-B' triblock copolymer,
wherein the blocks A and A' are conductive polymer units, and each independently are at least one selected from polyethylene oxide, polypropylene oxide, polysiloxane, polyethylene oxide-grafted polymethyl methacrylate, and polysiloxane-grafted polymethyl methacrylate, and the blocks B and B' are structural polymer units, and are each independently selected from polystyrene, polydivinyl benzene, polymethyl methacrylate, polyvinyl pyridine, polyimide, polyethylene, polypropylene, polyvinylidene fluoride, polyacrylonitrile, and polydimethyl siloxane.

21. The electrolyte of claim 19, wherein the block copolymer is polyethylene oxide-b-polystyrene, polyethylene oxide-b-polystyrene-b-polyethylene oxide, polystyrene-polyethylene oxide-b-polystyrene, polyethylene oxide-b-polymethylmethacrylate, or polyethylene oxide-b-(polystyrene-co-divinylbenzene.

22. The electrolyte of claim 10, further comprising at least one selected from a liquid electrolyte, a solid electrolyte, a gel electrolyte, a polymer ionic liquid, an inorganic particle, and a separator.

23. The electrolyte of claim 10, wherein the electrolyte has an ionic conductivity of about $1.0 \times 10^{-5}$ Siemens per meter or greater at about 25° C.

24. The electrolyte of claim 10, wherein the electrolyte has a tensile modulus of 8 megaPascals or greater at about 25° C.

25. The electrolyte of claim 10, wherein the electrolyte has a lithium ion transference number of about 0.2 or greater at about 25° C.

26. The electrolyte of claim 10, wherein the electrolyte has a reduction current of about 5 milliamperes or less at a voltage of about −0.35 volts with respect to lithium metal.

27. The electrolyte of claim 10, wherein the metal-organic framework is in the form of a plurality of primary particles, and has a primary particle size represented by Equation 1

$$0.0 < \sigma^2/\mu < 1.0 \quad \text{Equation 1}$$

wherein
- $\sigma^2$ is a variance of primary particle diameters of the metal-organic framework, as measured using dynamic laser scattering, and
- $\mu$ is an average particle diameter of the plurality of primary particles.

28. A lithium secondary battery comprising a cathode, an anode, and the electrolyte of claim 10 disposed between the cathode and the anode.

29. The lithium secondary battery of claim 28, further comprising at least one selected from a liquid electrolyte, a solid electrolyte, a gel electrolyte, a polymer ionic liquid, an inorganic particle, and a separator.

30. The lithium secondary battery of claim 28, wherein the anode is a lithium metal electrode or a lithium metal alloy electrode.

31. The lithium secondary battery of claim 28, wherein the anode is a lithium metal electrode or a lithium metal alloy electrode, and the secondary battery further comprises at least one selected from a liquid electrolyte, a gel electrolyte, a solid electrolyte, a separator, and a polymer ionic liquid, between the electrolyte and the cathode.

32. The lithium secondary battery of claim 28, wherein the electrolyte is coated on at least part of the anode.

33. The lithium secondary battery of claim 28, further comprising a liquid electrolyte adjacent to the cathode.

34. The lithium secondary battery of claim 28, wherein the cathode is a porous cathode impregnated with the composite.

35. A method of preparing a composite of claim 1, the method comprising mixing the metal-organic framework and the ionic liquid.

36. The method of claim 35, wherein the mixing of the metal-organic framework and the ionic liquid is performed in a vacuum at a temperature of about 50° C. to about 200° C.

37. A composite comprising:
a metal-organic framework; and
an ionic liquid disposed in a pore defined by the metal-organic framework, wherein an amount of the ionic liquid is in a range of about 0.1 parts to about 20 parts by weight, based on 100 parts by weight of a total weight of the composite,
wherein the metal-organic framework is a compound represented by Formula 1:

$$M_m O_k X_l L_p \quad \text{Formula 1}$$

wherein, in Formula 1,
M is at least one selected from $Ti^{4+}$ and $Al^{3+}$,
m is an integer of 1 to 10,
k is an integer of 1 to 10,
l is an integer of 1 to 10,
p is an integer of 1 to 10,
X is $OH^-$,
n is an integer of 1 to 4, and
L is a ligand of the formula R—(*COO—#)q, wherein q is an integer of 1 to 6, * indicates a binding site of the carboxylate group to R, # indicates a binding site of the carboxylate group to metal ion M, and r is an unsubstituted monocyclic C6 to C30 aryl group, and
wherein a cation of the ionic liquid is pyrrolidinium, and an anion ion of the ionic liquid is $CH_3SO_3^-$.

38. The composite of claim 37, wherein in Formula 1 r is an unsubstituted monocyclic C6 aryl group.

* * * * *